(12) United States Patent
Metzar et al.

(10) Patent No.: US 11,234,088 B2
(45) Date of Patent: Jan. 25, 2022

(54) CENTRALLY CONTROLLING COMMUNICATION AT A VENUE

(71) Applicant: Biamp Systems, LLC, Beaverton, OR (US)

(72) Inventors: Nicholas William Metzar, Beaverton, OR (US); Richard S. Juszkiewicz, Portland, OR (US); Matthew V. Kotvis, Portland, OR (US); Jason E. Damori, Portland, OR (US)

(73) Assignee: Biamp Systems, LLC, Beaverton, OR (US)

( * ) Notice: Subject to any disclaimer, the term of this patent is extended or adjusted under 35 U.S.C. 154(b) by 0 days.

(21) Appl. No.: 16/818,904

(22) Filed: Mar. 13, 2020

(65) Prior Publication Data
US 2020/0333997 A1    Oct. 22, 2020

Related U.S. Application Data

(60) Provisional application No. 62/834,522, filed on Apr. 16, 2019.

(51) Int. Cl.
G11B 27/00 (2006.01)
H04N 5/93 (2006.01)
H04N 9/80 (2006.01)
H04R 3/00 (2006.01)
H04R 27/00 (2006.01)
G06K 9/00 (2006.01)
G06F 3/16 (2006.01)
G10L 19/018 (2013.01)
G06F 9/54 (2006.01)
G10L 21/0316 (2013.01)

G10L 25/51 (2013.01)
H04R 3/04 (2006.01)
G06F 3/14 (2006.01)

(52) U.S. Cl.
CPC .......... H04R 27/00 (2013.01); G06F 3/1454 (2013.01); G06F 3/16 (2013.01); G06F 3/165 (2013.01); G06F 9/542 (2013.01); G06K 9/00624 (2013.01); G10L 19/018 (2013.01); G10L 21/0316 (2013.01); G10L 25/51 (2013.01); H04R 3/00 (2013.01); H04R 3/04 (2013.01); H04R 2499/11 (2013.01)

(58) Field of Classification Search
USPC ........ 386/278, 280, 282, 285, 287, 239, 248
See application file for complete search history.

(56) References Cited

U.S. PATENT DOCUMENTS 5,335,011 A    8/1994    Addeo et al.
8,144,893 B2   3/2012    Sherman
(Continued)

Primary Examiner — Daquan Zhao

(57) ABSTRACT

One example may include a method that includes receiving, at a server, a data set from one or more mobile devices located in a presentation space, combining the received data set with additional data to create a combined data set, creating a presentation signal based on the combined data set, subtracting a portion of one or more of the data set and the additional data set from the combined data set to create a modified presentation signal, forwarding the modified presentation signal to one or more of a display and a loudspeaker located in the presentation space, and playing the modified presentation signal via one or more of the loudspeaker and the display device.

20 Claims, 32 Drawing Sheets

(56) References Cited

U.S. PATENT DOCUMENTS

| | | | |
|---|---|---|---|
| 8,452,023 B2 | 5/2013 | Petit et al. | |
| 8,452,026 B2 | 5/2013 | Sherman | |
| 9,232,307 B2 | 1/2016 | Sherman et al. | |
| 9,538,011 B1 | 1/2017 | Sherman et al. | |
| 9,578,279 B1 * | 2/2017 | Kumar et al. | H04N 5/917 386/278 |
| 9,866,979 B2 | 1/2018 | Sherman et al. | |
| 10,210,882 B1 | 2/2019 | McCowan et al. | |
| 10,230,866 B1 * | 3/2019 | Townsend | H04N 1/2108 386/343 |
| 10,764,697 B2 | 9/2020 | Sherman et al. | |
| 2001/0002930 A1 | 6/2001 | Kates | |
| 2005/0063540 A1 * | 3/2005 | Hsiung | H04L 9/00 380/217 |
| 2006/0023729 A1 * | 2/2006 | Choi | H04L 29/06027 370/428 |
| 2006/0241490 A1 | 10/2006 | Lazenby | |
| 2007/0101249 A1 * | 5/2007 | Lee | H04S 7/30 715/203 |
| 2009/0060218 A1 | 3/2009 | Sherman | |
| 2010/0142725 A1 | 6/2010 | Goldstein et al. | |
| 2010/0215184 A1 | 8/2010 | Buck et al. | |
| 2011/0103612 A1 | 5/2011 | Chou et al. | |
| 2011/0206217 A1 | 8/2011 | Weis | |
| 2012/0087509 A1 | 4/2012 | Elmedyb et al. | |
| 2012/0308035 A1 | 12/2012 | Ginn et al. | |
| 2013/0039503 A1 | 2/2013 | Beaucoup et al. | |
| 2013/0070928 A1 | 3/2013 | Ellis et al. | |
| 2013/0070936 A1 | 3/2013 | Jensen et al. | |
| 2013/0083936 A1 | 4/2013 | Sorensen | |
| 2013/0216063 A1 | 8/2013 | Sherman et al. | |
| 2013/0294616 A1 | 11/2013 | Mülder | |
| 2013/0310122 A1 | 11/2013 | Piccionielli | |
| 2014/0003622 A1 | 1/2014 | Ikizyan et al. | |
| 2014/0023199 A1 | 1/2014 | Giesbrecht | |
| 2014/0037100 A1 | 2/2014 | Giesbrecht | |
| 2014/0258859 A1 | 9/2014 | Plumb | |
| 2014/0289626 A1 * | 9/2014 | Wu | G06F 21/6218 715/716 |
| 2015/0016661 A1 | 1/2015 | Lord | |
| 2015/0063590 A1 | 3/2015 | Katagiri | |
| 2015/0124995 A1 | 5/2015 | Defnet | |
| 2015/0178566 A1 | 6/2015 | Kritt et al. | |
| 2015/0269929 A1 | 9/2015 | Emery et al. | |
| 2015/0324642 A1 | 11/2015 | Jovicic et al. | |
| 2016/0134981 A1 | 5/2016 | Sherman et al. | |
| 2016/0255446 A1 | 9/2016 | Bernardi et al. | |
| 2017/0031530 A1 | 2/2017 | Ikeda et al. | |
| 2017/0076749 A1 | 3/2017 | Kanevsky et al. | |
| 2017/0289716 A1 | 10/2017 | Mizumoto et al. | |
| 2017/0374454 A1 | 12/2017 | Bernardini et al. | |
| 2018/0070185 A1 | 3/2018 | Pedersen et al. | |
| 2018/0115650 A1 | 4/2018 | Suzuki et al. | |
| 2018/0146307 A1 | 5/2018 | Petersen et al. | |
| 2018/0190260 A1 | 7/2018 | Christoph | |
| 2018/0302729 A1 | 10/2018 | Sherman et al. | |
| 2019/0027032 A1 | 1/2019 | Arunachalam | |
| 2019/0174226 A1 | 6/2019 | Yang et al. | |

* cited by examiner

CENTRALLY CONTROLLING COMMUNICATION AT A VENUE

TECHNICAL FIELD

This application relates to centrally controlling communications at a venue and more specifically to using mobile devices as individual microphones for communication when centrally controlling communication at a venue.

BACKGROUND

Conventional moderated questions of audience participants are asked utilizing a roving microphone and a roving microphone handler. In large audiences this is a daunting and difficult task. This approach to moderating questions, in large part, ignores the technological advances of recent years.

Other moderated audience interactions that utilize some technical advances to interact with the moderator lack the ability to distinguish presenter audio from the audience audio, resulting in a reverb or muddled audio.

Additionally, conventional moderated audience interactions lack the ability to pre-que the audience questions by recording and transcribing them, so that the most cogent question is asked at the most appropriate time.

Also, conventional moderated audience interactions lack the ability to micro-locate the audience participant within a larger environment and do not present the question(s) using audio/visuals or present the presentation in a virtual reality format.

Moreover, techniques to centrally control audience participation by harnessing mobile device capabilities and distributing workloads associated with computation intensive tasks may provide additional capabilities to audience participants and presenters.

SUMMARY

In a first example embodiment a method for centrally controlling communication at a venue with a plurality of participants may provide one or more of receiving via a plurality of mobile devices a respective plurality of audio signals from at least two of the plurality of participants by a communications bridge, mixing audio signals of the plurality of audio signals with a watermark audio signal and moderating a transmission of the mixed audio signals to the plurality of participants at the venue.

In another example method for centrally controlling communication at a venue with a plurality of participants, a method may provide one or more of receiving via a plurality of mobile devices a plurality of acoustic modem data signals and a plurality of audio signals from at least two of the plurality of participants by a communications bridge, mixing audio signals of the plurality of audio signals with a watermark audio signal and moderating a transmission of at least one of the plurality of acoustic modem data signals and the mixed audio signals to the plurality of participants at the venue.

In yet another example method for centrally controlling communication at a venue with a plurality of participants, a method may provide one or more of receiving via a plurality of mobile devices a respective plurality of audio signals from at least two of the plurality of participants by a communications bridge, recording the plurality of audio signals, transcribing the recorded plurality of audio signals, mixing audio signals of the plurality of audio signals with a watermark audio signal, selecting at least one of the recorded plurality of audio signals and moderating a transmission of at least one of the selected plurality of audio signals to the plurality of participants at the venue.

In yet another example method of operation for centrally controlling communication at a venue with a plurality of participants, the method may include one or more of receiving via a plurality of mobile devices a respective plurality of audio signals and a respective plurality of acoustic modem data signals from at least two of the plurality of participants by a communications bridge, recording the plurality of audio signals, transcribing the recorded plurality of audio signals, mixing audio signals of the plurality of audio signals with a watermark audio signal, selecting at least one of the recorded plurality of audio signals and moderating a transmission of at least one of the plurality of acoustic modem data signals and of at least one of the selected plurality of audio signals to the plurality of participants at the venue.

In still yet another example method for centrally controlling communication at a venue with a plurality of participants, the method may include one or more of receiving via a plurality of mobile devices a respective plurality of audio visual signals from at least two of the plurality of participants by a communications bridge, mixing audio visuals signals of the plurality of audio visual signals with a watermark audio signal and moderating a transmission of the mixed audio visual signals to the plurality of participants at the venue.

In still yet a further example method for centrally controlling communication at a venue with a plurality of participants, the method may include one or more of receiving via a plurality of mobile devices a plurality of acoustic modem data signals and a plurality of audio visual signals from at least two of the plurality of participants by a communications bridge, mixing audio signals of the plurality of audio visual signals with a watermark audio signal and moderating a transmission of at least one of the plurality of acoustic modem data signals and the mixed audio signals to the plurality of participants at the venue.

In still yet another example method for centrally controlling communication at a venue with a plurality of participants, the method may include one or more of receiving via a plurality of mobile devices a respective plurality of audio signals and a respective plurality of location signals from at least two of the plurality of participants by a communications bridge, mixing audio signals of the plurality of audio signals with a watermark audio signal, capturing at least one photograph of at least one participant of the plurality of participants with the respective location signal and moderating a transmission of the mixed audio signals and the captured at least one photograph to the plurality of participants at the venue.

In still yet another example method for centrally controlling communication at a venue with a plurality of participants, the method may include one or more of receiving via a plurality of mobile devices a plurality of respective data signals, a plurality respective of audio signals and a respective plurality of location signals from at least two of the plurality of participants by a communications bridge, mixing audio signals of the plurality of audio signals with a watermark audio signal and capturing at least one photograph of at least one participant of the plurality of participants with the respective location signal and moderating a transmission of at least one of the plurality of acoustic modem data signals, the mixed audio signals and the captured at least one photograph to the plurality of participants at the venue.

In yet a further example method for centrally controlling communication at a venue with a plurality of participants, the method may include one or more of receiving via a plurality of mobile devices a respective plurality of audio visual signals from at least two of the plurality of participants by a communications bridge, mixing audio visual signals of the plurality of audio visual signals with a watermark audio signal, capturing at least one photograph of at least one participant of the plurality of participants with the respective mobile device of the plurality of mobile devices and moderating a transmission of the mixed audio visual signals and the captured at least one photograph to the plurality of participants at the venue.

In a further example method for centrally controlling communication at a venue with a plurality of participants, the method may include one or more of receiving via a plurality of mobile devices a plurality of data signals and a plurality of audio visual signals from at least two of the plurality of participants by a communications bridge, mixing audio visual signals of the plurality audio visual signals with a watermark audio signal and moderating a transmission of at least one of the plurality of data signals and the mixed audio visual signals to the plurality of participants at the venue.

In yet still a further example method for centrally controlling communication at a venue with a plurality of participants, the method may include one or more of receiving via a plurality of mobile devices a respective plurality of audio signals from at least two of the plurality of participants by a communications bridge, mixing audio signals of the plurality of audio signals with a watermark audio signal and moderating a transmission of the mixed audio signals via virtual reality to the plurality of participants at the venue.

In yet another example method for centrally controlling communication at a venue with a plurality of participants, the method may include one or more of receiving via a plurality of mobile devices a plurality of data signals and a plurality of audio signals from at least two of the plurality of participants by a communications bridge, mixing audio signals of the plurality of audio signals with a watermark audio signal and moderating a transmission of at least one of the plurality of data signals and the mixed audio signals via virtual reality to the plurality of participants at the venue.

In yet another example method for centrally controlling communication at a venue with a plurality of participants, the method may include one or more of receiving via a plurality of participant mobile devices a respective plurality of audio signals from at least two of the plurality of participants by a communications bridge, mixing audio signals by the respective participant mobile device of the plurality of audio signals with a watermark audio signal, wherein the watermark audio signal includes an embedded data, displaying the embedded data to a presenter and moderating a transmission of the audio signals to the plurality of participants at the venue.

In yet still another example method for centrally controlling communication at a venue with a plurality of participants, the method may include one or more of receiving via a plurality of participant mobile devices a respective plurality of audio signals from at least two of the plurality of participants by a communications bridge, mixing audio signals by the communication bridge of the plurality of audio signals with a watermark audio signal, and the watermark audio signal includes an embedded data, displaying the embedded data to the plurality of participants at the venue via the plurality of participant mobile devices and moderating a transmission of the audio signals to the plurality of participants at the venue.

Still yet further, another example embodiment may include a method that includes one or more of receiving, at a server, a data set from one or more mobile devices located in a presentation space, combining the received data set with additional data to create a combined data set, creating a presentation signal based on the combined data set, subtracting a portion of one or more of the data set and the additional data set from the combined data set to create a modified presentation signal, forwarding the modified presentation signal to one or more of a display and a loudspeaker located in the presentation space, and playing the modified presentation signal via one or more of the loudspeaker and the display device.

Still yet another example embodiment may include an apparatus that includes a receiver configured to receive a data set from one or more mobile devices located in a presentation space, a processor configured to combine the received data set with additional data to create a combined data set, create a presentation signal based on the combined data set, subtract a portion of one or more of the data set and the additional data set from the combined data set to create a modified presentation signal, forward the modified presentation signal to one or more of a display and a loudspeaker located in the presentation space, and play the modified presentation signal via one or more of the loudspeaker and the display device.

Still yet another example embodiment may include a non-transitory computer readable storage medium configured to store instructions that when executed cause a processor to perform receiving, at a server, a data set from one or more mobile devices located in a presentation space, combining the received data set with additional data to create a combined data set, creating a presentation signal based on the combined data set, subtracting a portion of one or more of the data set and the additional data set from the combined data set to create a modified presentation signal, forwarding the modified presentation signal to one or more of a display and a loudspeaker located in the presentation space, and playing the modified presentation signal via one or more of the loudspeaker and the display device.

Still yet another example embodiment may include a method that includes receiving, at a presentation server, an audio data signal from a mobile device located in a presentation space, identifying a mobile device identification characteristic of the mobile device based on the received audio data signal, determining a mobile device location via a location determination procedure, and playing the audio signal via a loudspeaker.

Still yet another example embodiment may include an apparatus that includes a receiver configured to receive, at a presentation server, an audio data signal from a mobile device located in a presentation space, and a processor configured to identify a mobile device identification characteristic of the mobile device based on the received audio data signal, determine a mobile device location via a location determination procedure, and play the audio signal via a loudspeaker.

Still yet another example embodiment may include a non-transitory computer readable storage medium configured to store instructions that when executed cause a processor to perform receiving, at a presentation server, an audio data signal from a mobile device located in a presentation space, identifying a mobile device identification characteristic of the mobile device based on the received audio data signal, determining a mobile device location via a location determination procedure, and playing the audio signal via a loudspeaker.

Still yet another example embodiment may include a method that includes one or more of initiating an audio recording to capture audio data, comparing the audio data received from a microphone of a mobile device to an audio data range, determining whether the audio data is above an optimal level based on a result of the comparison, and queuing the audio data in an audio data queue when the audio data is above the optimal level.

Another example embodiment may include an apparatus that includes a processor configured to initiate an audio recording to capture audio data, compare the audio data received from a microphone of a mobile device to an audio data range, determine whether the audio data is above an optimal level based on a result of the comparison, and queue the audio data in an audio data queue when the audio data is above the optimal level.

Still yet another example embodiment may include a non-transitory computer readable storage medium configured to store instructions that when executed cause a processor to perform one or more of initiating an audio recording to capture audio data, comparing the audio data received from a microphone of a mobile device to an audio data range, determining whether the audio data is above an optimal level based on a result of the comparison, and queuing the audio data in an audio data queue when the audio data is above the optimal level.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles of those embodiments.

Figure 1:
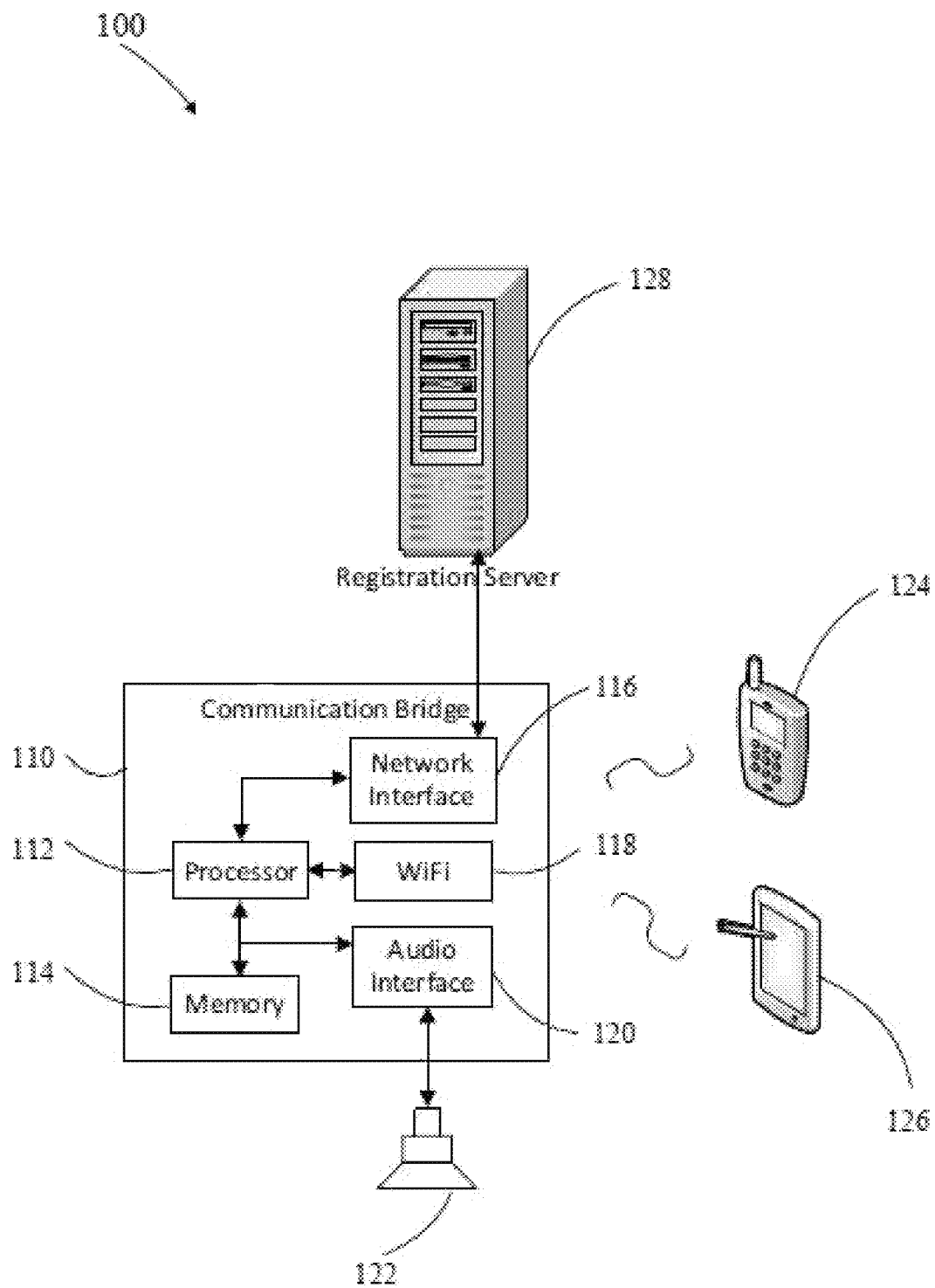
FIG. 1 depicts an overall system diagram, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as a processor(s) with one or more software components (e.g., program code, firmware, resident software, micro-code, etc.) stored in a tangible computer-readable memory device such as a tangible computer memory device, that in combination, form a specifically configured apparatus that performs the functions as described herein. These combinations that form specially-programmed devices may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

An example method according to example embodiments may provide mixing of participant mobile device, or communication bridge content, generated or stored content, such as background music, presentation media, and the like which is intended for delivery to a multimedia reinforcement system.

In one example, low-level audible, but not loud attention-getting noise masking signals, are mixed with the participant audio for the purpose of obscuring interfering sounds from adjacent spaces during times of active and inactive participant audio shared via their mobile devices.

An inaudible (i.e., human perceived) audio-signal 'watermark' signal may be included with certain audio and other data to enable delivery of information from or about the participant mobile device and its user, the surrounding environment, and the like, without using out-of-band transmission methods.

In this disclosure an audio generator is utilized to create an audio 'watermark' that may be mixed with the audio signal. The audio generator may be added to a web-based audio visual codec.

The mixing of audio sounds may be performed in the participant mobile devices, communication bridge and/or multimedia reinforcement system. The communication bridge may act as a call termination device.

Participant audio feeds may be mixed from a plurality of local participant mobile devices, especially where a multi-duplex conversation is desired involving more than one user/device, or when a user experience is desired that does not require the user to press a button to be heard such as when a manual or automatic mixing operation is being performed.

The mixing of the participant audio may be performed at the participant mobile device or via a communication bridge in communication with the mobile device. The generated audio intended for delivery to the multimedia reinforcement system may be stored for later processing.

In another example, one or more presenter audio feeds are mixed with the participant audio from the participant mobile device. This mix of audio may be utilized for recording, transcription and/or conferencing audio sent to a remote participant and the like.

In another example, one or more remote participant audio feeds are mixed with local participants. A request to speak chime sound may be generated in the participant mobile device or the communication bridge mixed with the participant audio.

In yet another example, acquisition by the participant mobile device of visual information for processing on the participant mobile device or communication bridge may assist in audio intelligibility enhancement.

Processing algorithms that benefit from a reference signal may be mixed with the participant audio to enhance the audio, examples of this are acoustic echo cancellation and feedback suppression.

A mix may be used for reverberation, to modify the participant audio so as to more clearly delineate the difference between participants or enhance the environmental experience for the audience.

Some participant mobile devices may have multiple microphone elements, by mixing the raw participant audio received from one microphone, using the additional audio acquired by the additional microphones, noise cancellation may be performed to enhance the participant's question asking experience while being located in a large room with various noise sources.

In another example the system may include a communication bridge, such as a centrally located device that has the capability to identify locations of the participant mobile devices. The location generation operation permits an array of audio outputs for the larger-scale multimedia reinforcement system with the participant mobile device audio feeds sourced closest to the multimedia reinforcement loudspeaker being subtracted from the mix of audio. The location discovery process may be performed via audio signal acquisition and mixing from the participant mobile devices or other methods such as RF triangulation, GPS, beacon signal measurements among other types of location discovery.

Another example method may include recording and queuing audio clips such as questions from participants, and subtracting the presenter audio and/or other background noise that might have been inadvertently captured by the participant mobile device microphone. This information can then be used to present a question by one user to the entire audience without disruptive audio feeds, such as the speaker's audio, crowd noise, and other unwanted noises.

In another example, text messages may be read aloud by a text-to-speech processing engine, utilizing the participant mobile device and or the communication bridge to receive, and insert the text-based questions or comments into a live feed shared by the presenter at a particular time.

In another example method of operation, other media may be shared, such as by a process that includes acquiring, sending, processing, and displaying participant-annotated photos of the event and/or presentation to enhance the interaction between a participant and a presenter, moderator, audience members and the like.

The system server may use event content slides, abstracts, multimedia, and the like, to provide input to inform and train a neural network function to provide optimal speech-to-text accuracy. The system may utilize multimedia watermarking to transparently deliver closed captioning or other information.

Another example method may include an augmented reality system in which watching or listening to the event permits rendering of the information conveyed by the 'watermark' on another device. This may permit for uncoordinated cooperation such as registration, electronic connections and the like between the transmitting and receiving systems in order to render the desired content.

FIG. 1 depicts an overall system diagram 100 including a communications bridge 110, which is comprised of at least a processor 112 coupled to a memory 114 that includes a non-transitory computer readable storage medium. The processor 112 may be coupled to a WiFi interface 118, a network interface 116 and an audio interface 120. The network interface 116 is coupled to a registration server 128. In one embodiment the coupling is by direct line connection by a corporate LAN, in other embodiments the connection may be by a WLAN or via cellular communication. The audio interface 120 is coupled to a multimedia reinforcement system 122. A participant mobile device 124 is wirelessly coupled to the WiFi interface, or may be coupled by a cellular connection. The presenter mobile device 126 is coupled to the WiFi interface 118 or may be coupled by direct line connection. The communications bridge may also comprise a watermark differentiator 2312 (see FIG. 23) for extracting information embedded in a participant audio transmitted to the communications bridge 110 and a watermark integrator 2312 for integrating data into the outgoing audio signal.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art. An exemplary storage medium may be coupled to the processor such that the processor may read information from, and write information to, the storage medium.

In the alternative, the storage medium may be integral to the processor. The processor and the storage medium may reside in an application specific integrated circuit ("ASIC"), or, the processor and the storage medium may reside as discrete components.

The application may be coded in software in a computer language understood by the processor, and stored in a computer readable medium, such as, the memory. The computer readable medium may be a non-transitory computer readable medium that includes tangible hardware components in addition to software stored in memory. Furthermore, a software module may be another discrete entity that is part of the network entity, and which contains software instructions that may be executed by the processor.

Figure 2:
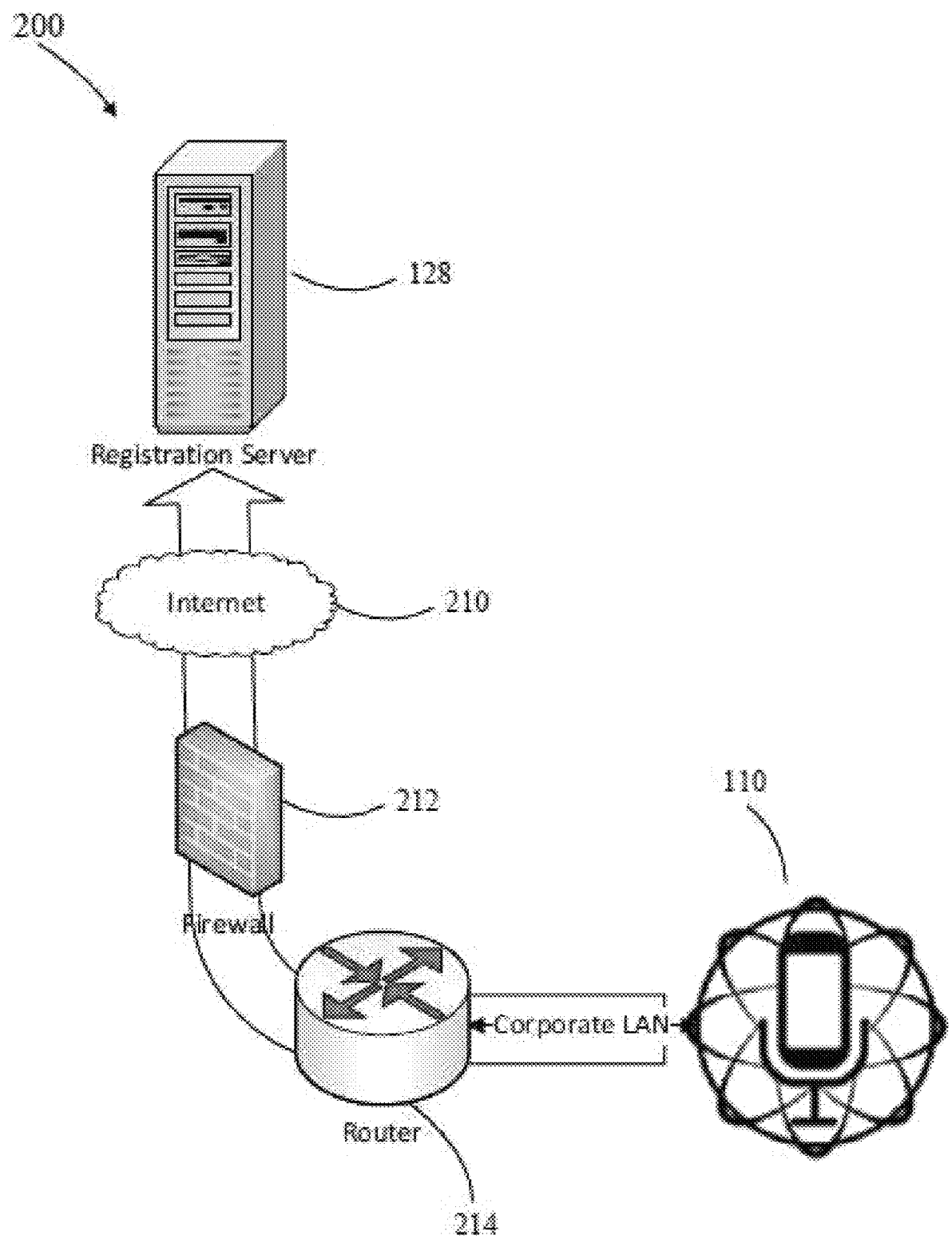
FIG. 2 depicts a first system diagram in which the communication bridge is connected through a firewall to a registration server, in accordance with some embodiments.

FIG. 2 depicts a second example system diagram 200 in which the communication bridge 110 (depicted as a audio device) is connected via a corporate LAN to a router 214 and a firewall 212 to the Internet 210 and in communication with a registration server 128. In this example, once connected to the network and an internal IP address is obtained, the communication bridge registers its session number and internal IP address to the registration server.

As may be observed from the example of FIG. 2, the communications bridge 110 communicates via a corporate LAN through a router 214 and firewall 212 to the registration server 128. The registration server 128 has a memory and processor and the communications bridge 110 has a memory 114 and processor 112.

Figure 3:
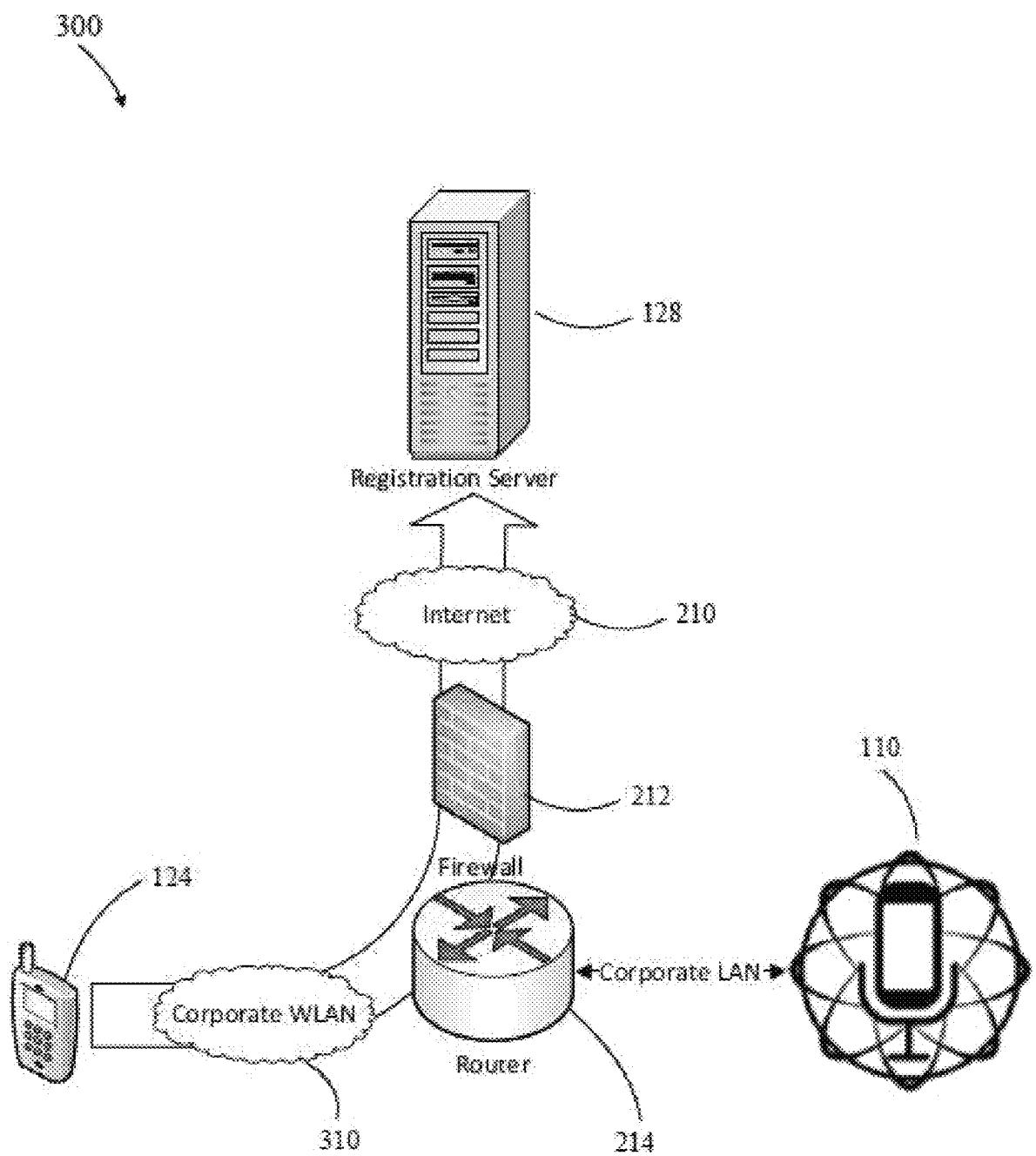
FIG. 3 depicts a second system diagram in which a mobile device is connected through a firewall to a registration server, in accordance with some embodiments.

FIG. 3 depicts another example system diagram 300 in which the mobile device 124 is connected through a corporate WLAN 310, a router 214 and a firewall 212 to a registration server 128 via the Internet 210. In this example, by entering the session ID, the audience members, participants and presenters query the registration server 128 to find the internal IP address of the communication bridge 110. In this figure the participant mobile device 124 or presenter mobile device (different or the same) are registered via a wireless LAN 310 and router 214, through the firewall 212 to the registration server 128. By utilizing a WLAN 310, the devices 124 within the venue may be registered and interact with the communications bridge 110.

Figure 4:
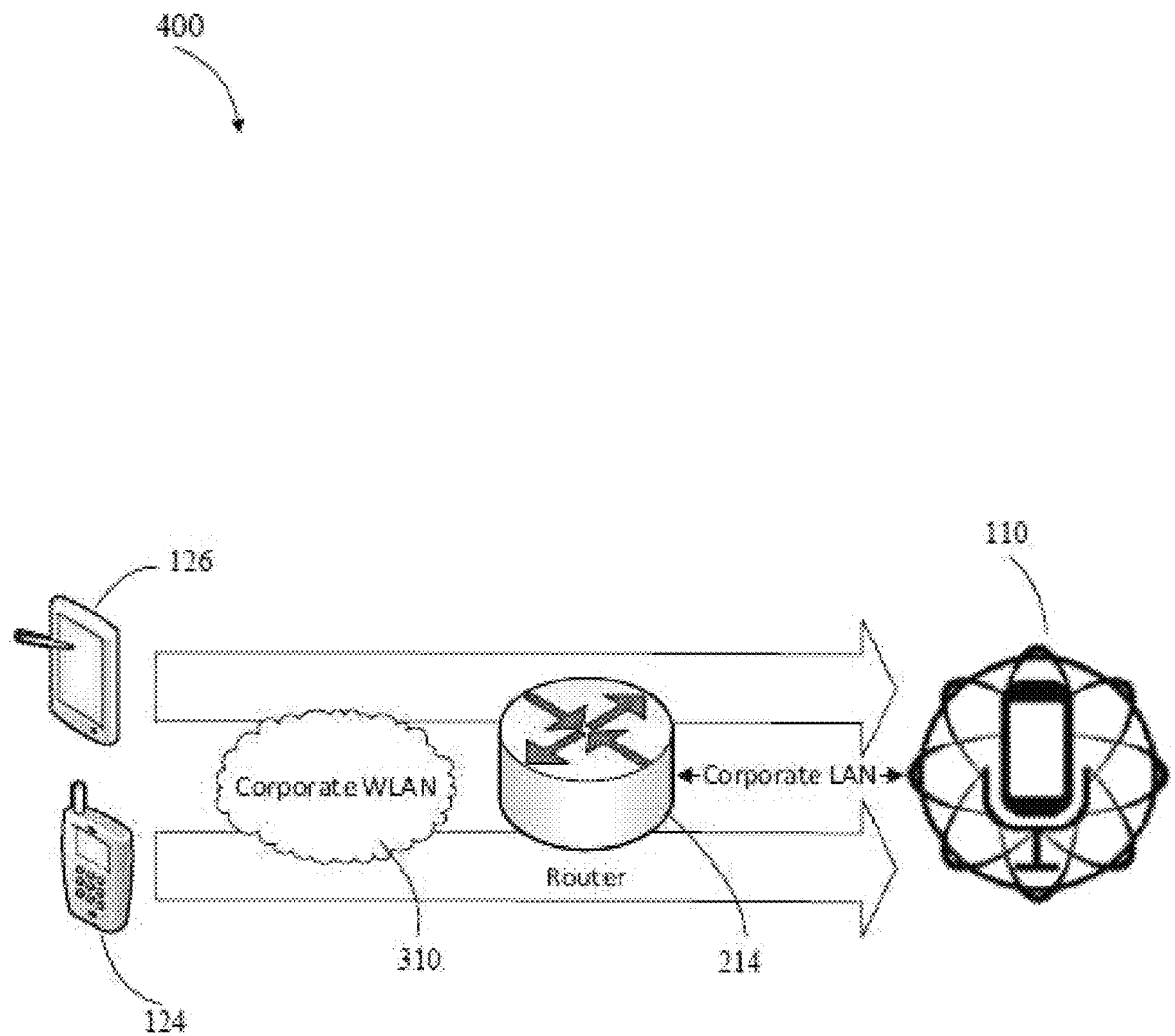
FIG. 4 depicts a third system diagram in which a presenter mobile device, a participant mobile device and communication bridge are connected, in accordance with some embodiments.

FIG. 4 depicts another example system diagram 400 in which a presenter mobile device 126, a participant mobile device 124 and communication bridge 110 are connected through the corporate WLAN 310 and the router 214. Using the internal IP address retrieved from the registration server (see FIG. 1 element 128), the participant mobile device(s) 124 connects to the communications bridge 110, and the presenter mobile device 126 connects to the communication bridge 110 on a different port. The communication bridge 110 acts as a proxy server permitting communication between the devices 124 and 126. In this figure, the participant mobile device 124 and the presenter mobile device 126 communicate via the WLAN 310 to the communications bridge 110.

Figure 5:
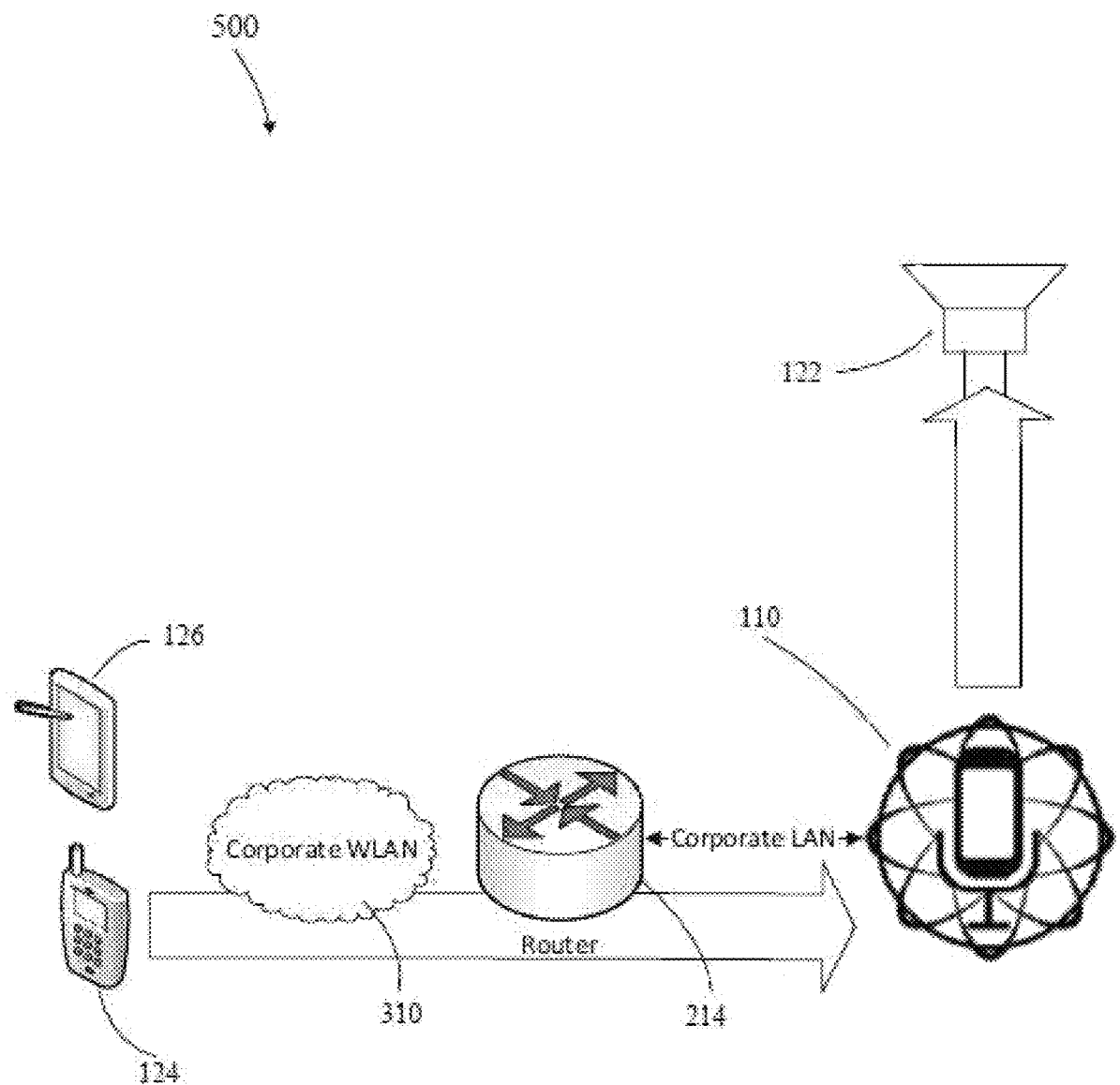
FIG. 5 depicts a fourth system diagram in which the communication bridge is connected to a multimedia reinforcement speaker system to output a mixed audio signal, in accordance with some embodiments.

FIG. 5 depicts another system diagram 500 in which the communication bridge 110 is connected to a multimedia reinforcement speaker system 122 to output a mixed audio signal. For example, once a participant audience member has been selected to speak, the audience member may speak and the audio signals are captured by the participant's mobile device 124 and converted to audio packets, which are sent from the participant mobile device 124 to the communication bridge 110. These audio packets are then converted and sent to the communication bridge audio output (see FIG. 1 element 120). In this figure, the output from the communications bridge 110 is communicated to the audience of the venue through the multimedia reinforcement system 122. The audience can then hear the participant's question being announced as a filtered audio signal which removed the background noises of other members, the speaker, and any other undesirable sounds via a digital filtering procedure.

Figure 6:
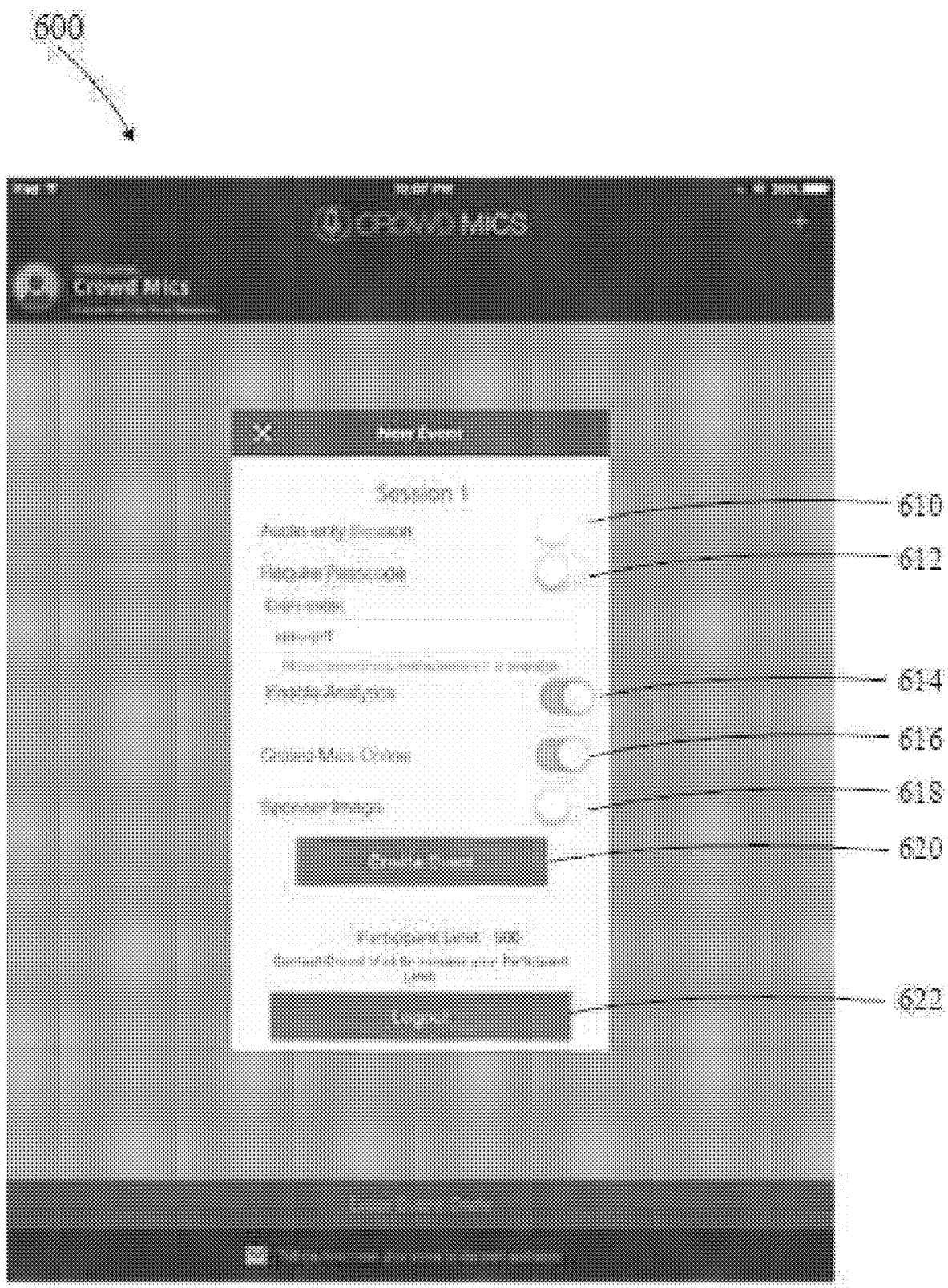
FIG. 6 depicts a user smartphone interface of an example depicting creating an event, in accordance with some embodiments.

FIG. 6 depicts an example screenshot 600 depicting a user interface used to create an event via the system controller. In this example, the organizer is prompted to decide upon a series of parameters, such as whether the session will be audio only 610 and whether a passcode is needed 612 to interact with the presenters. The system allows the selection of analytics 614 and whether participant audio will be included in the event 616 as well as the presentation of presenter images 618 and audience size. The event may be created 620 and the option to logout 622 may be selected.

Figure 7:
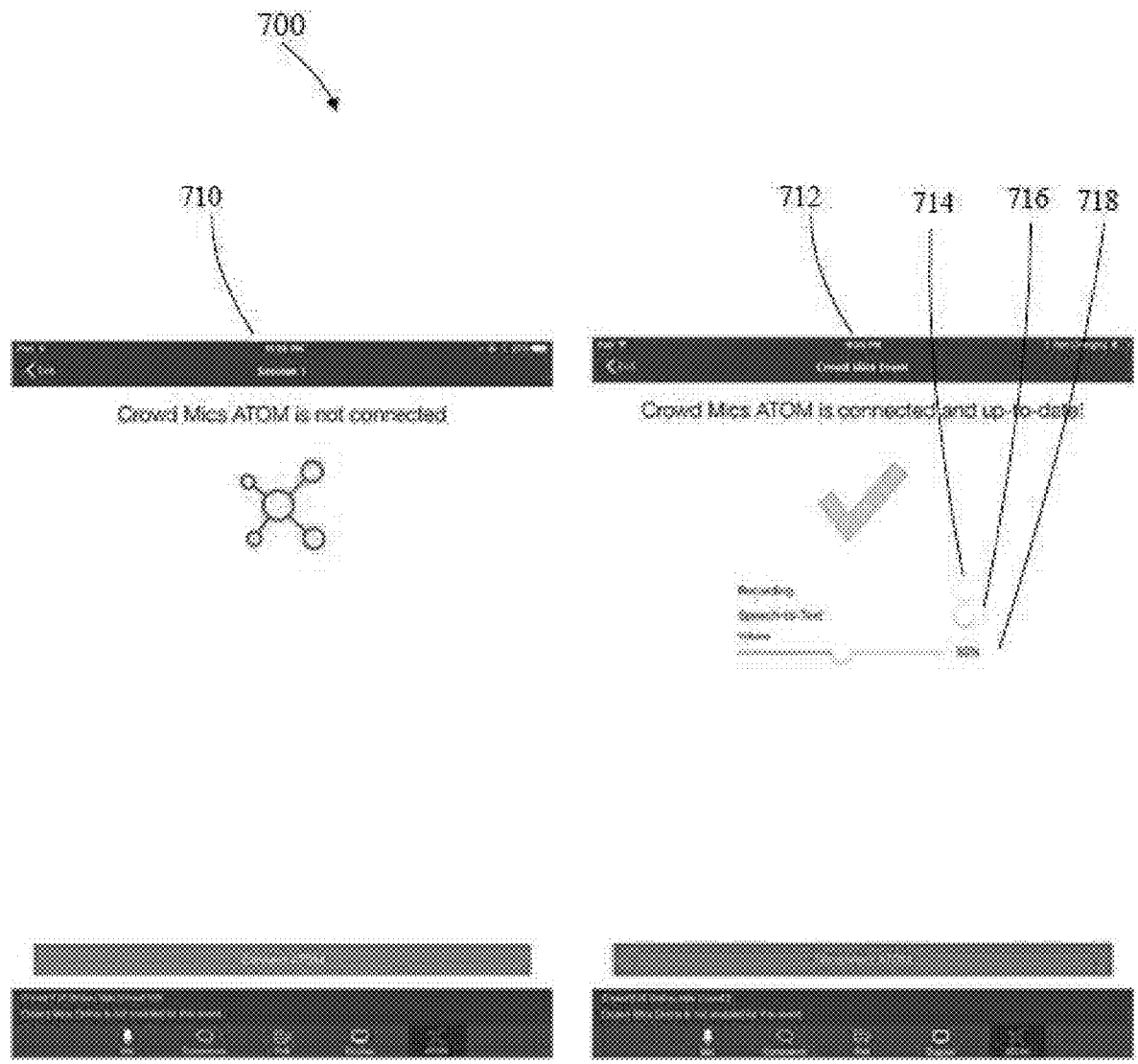
FIG. 7 depicts a second set of screenshots depicting a communication bridge connection status in which the components are unlinked and linked.

FIG. 7 depicts another screenshot of a user interface 700 illustrating a communication bridge connection status in which the components are unlinked 710 or linked 712, and which permit the organizer of the event to connect the communications bridge (See FIG. 1 element 110) for the event. The communications bridge sends feedback via the WLAN indicating a status of the setup. The configuration also permits the organizer to select whether the event and comments are recorded 714, whether the comments are converted from speech to text 716 and the volume of the system 718. The organizer is additionally permitted to disconnect the communications bridge.

Figure 8:
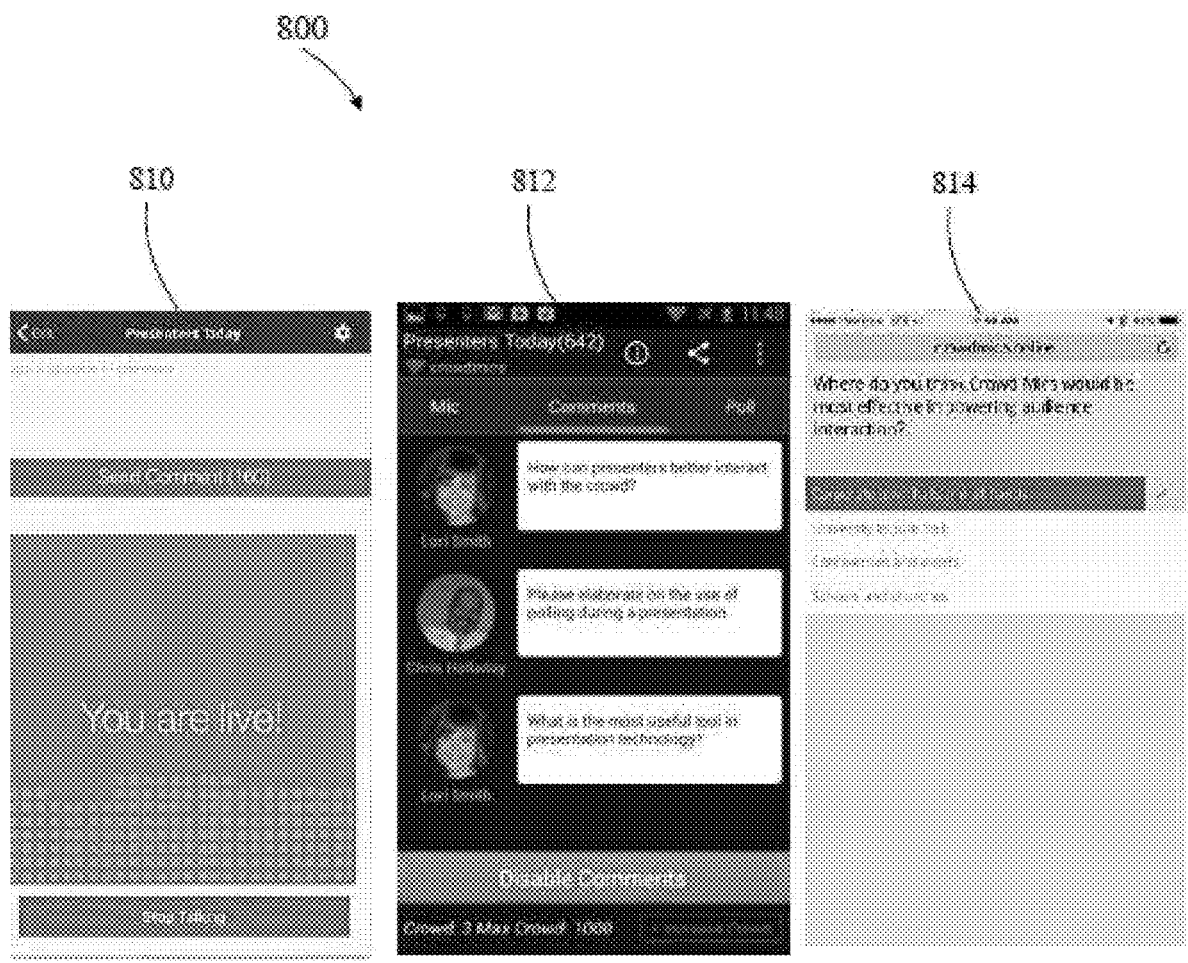
FIG. 8 depicts a third set of screenshots depicting sharing audio comments, text comments and polling, in accordance with some embodiments.

FIG. 8 depicts another example set of screenshots 800 of a user mobile device depicting a selection to speak to the audience 810, send comments 812 to be communicated to the audience, and answering polling questions 814. The participants are each permitted to select whether to communicate by way of voice comments and text comments via their respective mobile devices. The comments text/audio/media may be received and collected via the system server of the registration server and/or communications bridge 100. The presenter may be able to access the comments, play the comments to the audience via the loudspeaker, and respond to the comments when appropriate.

Figure 9:
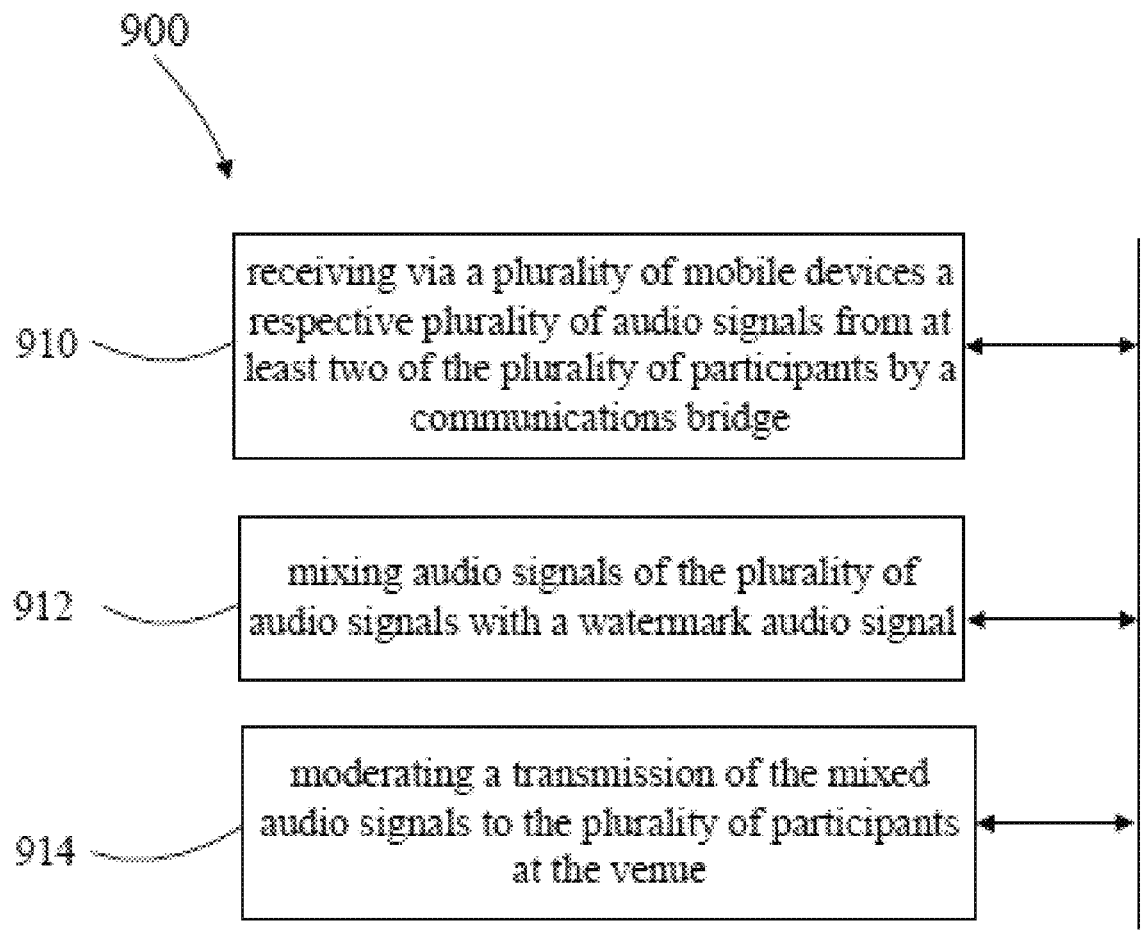
FIG. 9 depicts an example method for centrally controlling communication at a venue, in accordance with some embodiments.

FIG. 9 depicts an example method or non-transitory computer readable storage medium configured to store instructions for execution by a processor for centrally controlling communication 900 at a venue with a plurality of participants. The example method may include one or more of receiving 910 via a plurality of mobile devices a respective plurality of audio signals from at least two of the plurality of participants by a communications bridge, mixing 912 audio signals of the plurality of audio signals with a watermark audio signal and moderating 914 a transmission of the mixed audio signals to the plurality of participants at the venue. The moderated transmission is communicated to the participants and the audience by way of a multimedia reinforcement speaker system (see FIG. 1 element 122).

The method provides any user with a mobile device that can wirelessly connect within a venue server to use their mobile devices to proffer questions in the form of vocalized questions and/or text questions which will be received and answered by a moderator/speaker. The server may receive the vocal questions and mix a 'watermark' audio signal with the question before broadcasting the question to the audience. The mixed question data and watermark audio signals that the user phone(s) receive from the earlier submitted questions are automatically subtracted from the audio stream so that only the question data is sent without the background multimedia reinforcement speaker audio stream, or other background noise. In this way, the audio signals may be modified to differentiate an audience comment from a presenter comment. By the addition of the watermark audio signal, a clean signal may be extracted by the system. The audio signals from the participants may be a multi-duplex communication.

The example method may also provide removing previously mixed audio signals from the respective plurality of audio signals, and where the watermark audio signal further includes a noise cancellation signal. The method of mixing audio signals may be performed by the mobile device or by the communications bridge. The audio signals and the watermark audio signal are communicated in-band to the communications bridge.

Another example method may include locating the mobile devices within a fixed area to subtract moderated transmissions from an adjacent amplified sound, removing certain mixed audio signals from the received plurality of audio signals and removing audio signals from adjacent multimedia reinforcement speakers from the received plurality of audio signals. Locating the participant mobile device may be performed by matching the direction indicated by a beamforming antenna with the spoken comments via GPS, RF triangulation, beacons, internal location detection based on accelerometers and gyros, etc. The audio transmissions to the audience may be by a multimedia reinforcement system which acts in part as an amplified audio system.

Figure 10:
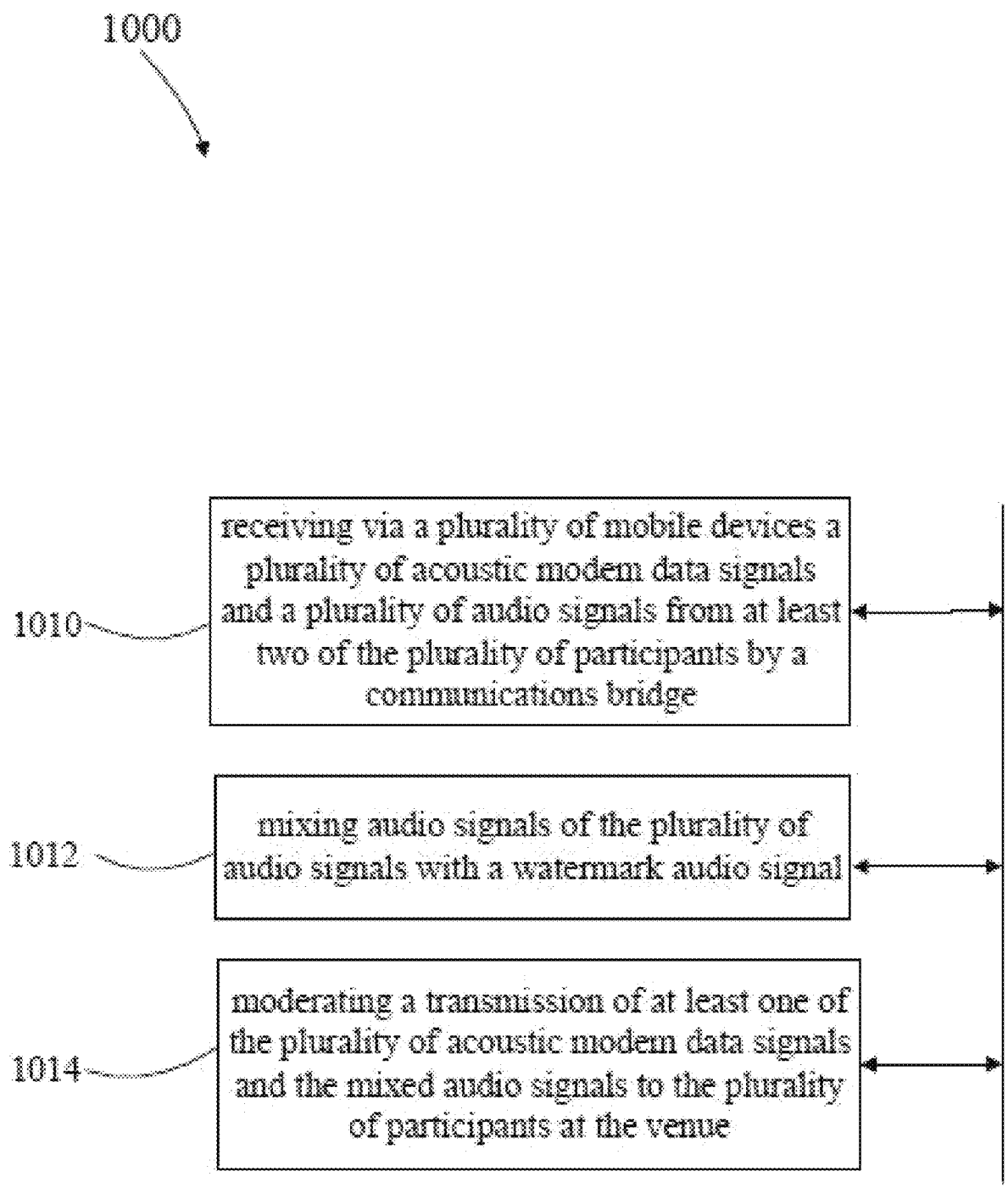
FIG. 10 depicts another example method for centrally controlling communication at a venue, in accordance with some embodiments.

FIG. 10 depicts an example method or non-transitory computer readable storage medium configured to store instructions for execution by a processor for centrally controlling communication 1000 at a venue with a plurality of participants. The method may include receiving 1010 via a plurality of mobile devices a plurality of acoustic modem data signals and a plurality of audio signals from at least two of the plurality of participants by a communications bridge, mixing 1012 at least one of the audio signals of the plurality of audio signals with a watermark audio signal and moderating 1014 a transmission of at least one of the plurality of acoustic modem data signals and the mixed audio signals to the plurality of participants at the venue. The moderated transmission is communicated to the participants and the audience by way of a multimedia reinforcement speaker system (see FIG. 1 element 122).

The method of FIG. 10 is similar to that of FIG. 9 with the inclusion of communicating data by acoustic modem data signals. The method may further include receiving text messages via the plurality of acoustic modem data signals and converting the received text message to speech for moderated transmission.

Figure 11:
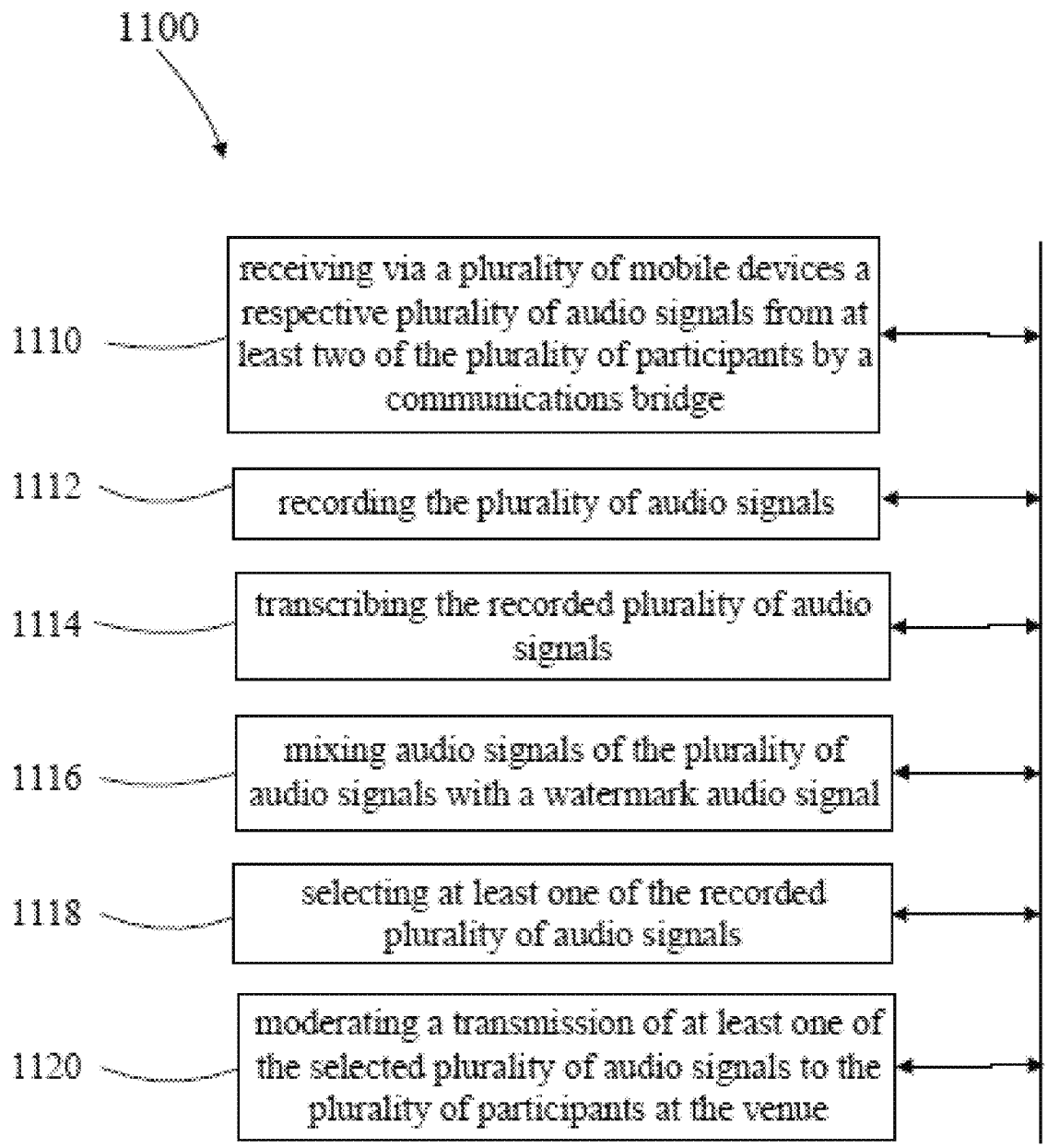
FIG. 11 depicts another example method for centrally controlling communication at a venue, in accordance with some embodiments.

FIG. 11 depicts a method or non-transitory computer readable storage medium configured to store instructions for execution by a processor for centrally controlling communication 1100 at a venue with a plurality of participants, the method may include receiving 1110 via a plurality of mobile devices a respective plurality of audio signals from at least two of the plurality of participants by a communications bridge, recording 1112 the plurality of audio signals, transcribing 1114 the recorded plurality of audio signals, mixing audio signals 1116 of the plurality of audio signals with a watermark audio signal, selecting 1118 at least one of the recorded plurality of audio signals and moderating 1120 a transmission of at least one of the selected plurality of audio signals to the plurality of participants at the venue. The moderated transmission is communicated to the participants and the audience by way of a multimedia reinforcement speaker system (see FIG. 1 element 122).

The method of FIG. 11 may also include recording the audio signal question(s), transcribing them for the moderator to select from and after the moderator has selected the question, broadcasting the question. In this way, received questions may be answered at the most appropriate times in the presentation, the most interesting or probing questions asked may be selected from a list of questions which provides the presenter(s) a few moments to think about an answer before the question is broadcast. Additionally, the mixed question and watermark audio signals the mobile devices receive from earlier questions are automatically subtracted from the audio stream so that only the question without the background multimedia reinforcement speaker audio stream is sent.

Figure 12:
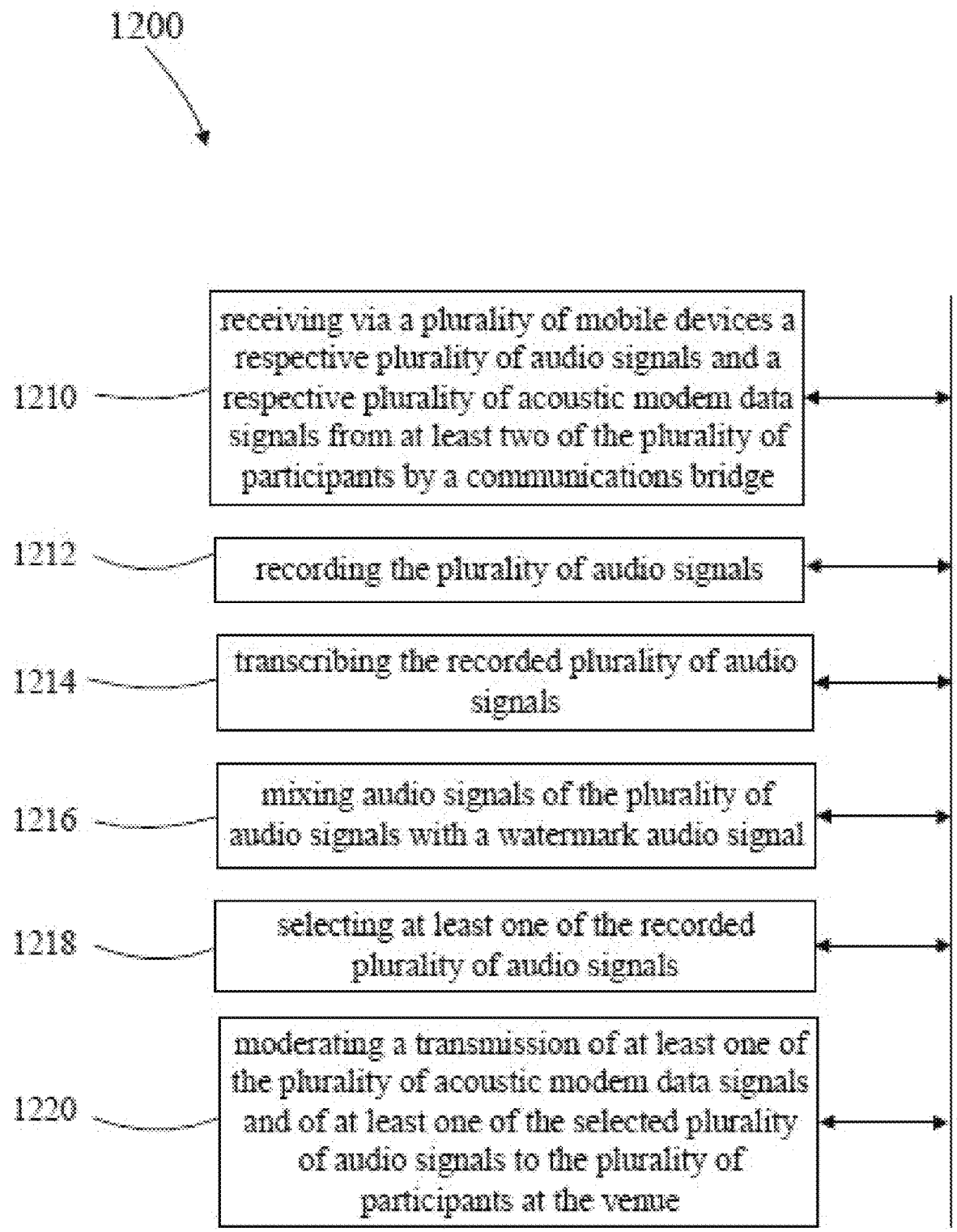
FIG. 12 depicts another example method for centrally controlling communication at a venue, in accordance with some embodiments.

FIG. 12 depicts a method or non-transitory computer readable storage medium configured to store instructions for execution by a processor for centrally controlling communication 1200 at a venue with a plurality of participants. The method may include receiving 1210 via a plurality of mobile devices a respective plurality of audio signals and a respective plurality of acoustic modem data signals from at least two of the plurality of participants by a communications bridge, recording 1212 the plurality of audio signals, transcribing 1214 the recorded plurality of audio signals, mixing 1216 audio signals of the plurality of audio signals with a watermark audio signal, selecting 1218 at least one of the recorded plurality of audio signals and moderating 1220 a transmission of at least one of the plurality of acoustic modem data signals and of at least one of the selected plurality of audio signals to the plurality of participants at the venue. The moderated transmission is communicated to the participants and the audience by way of a multimedia reinforcement speaker system (see FIG. 1 element 122).

The method of FIG. 12 is similar to that of FIG. 11 with the inclusion of communicating data by acoustic modem data signals. The method may further include receiving text messages via the plurality of acoustic modem data signals and converting the received text message to speech for moderated transmission.

Figure 13:
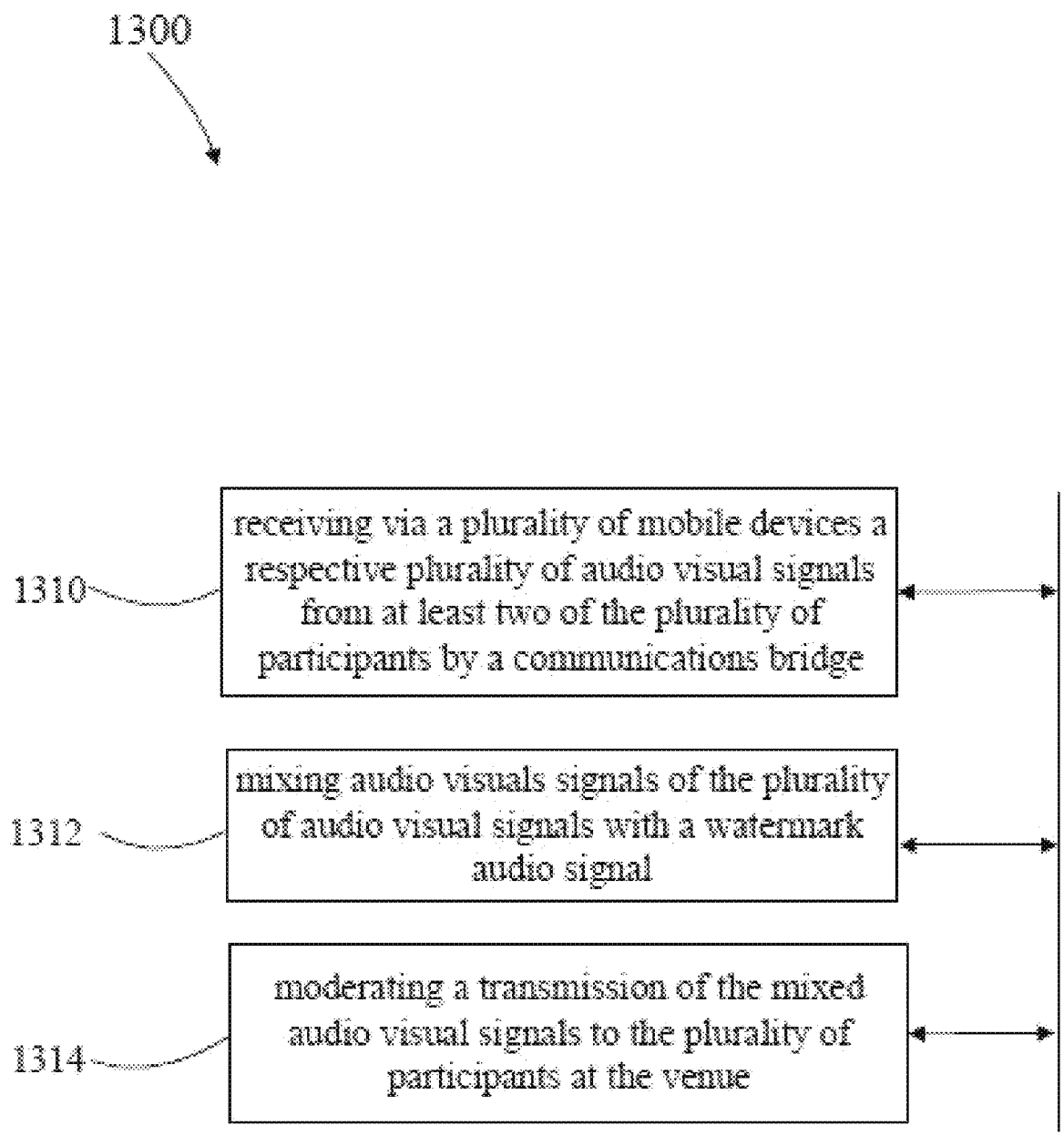
FIG. 13 depicts another example method for centrally controlling communication at a venue, in accordance with some embodiments.

FIG. 13 depicts a method or non-transitory computer readable storage medium configured to store instructions for execution by a processor for centrally controlling communication 1300 at a venue with a plurality of participants. The method may include receiving 1310 via a plurality of mobile devices a respective plurality of audio visual signals from at least two of the plurality of participants by a communications bridge, mixing 1312 the audio visuals signals of the plurality of audio visual signals with a watermark audio signal and moderating 1314 a transmission of the mixed audio visual signals to the plurality of participants at the venue. The moderated transmission is communicated to the participants and the audience by way of a multimedia reinforcement speaker system (see FIG. 1 element 122).

The method of FIG. 13 is similar to the method of FIG. 9 with the addition of audio visual signals being added to the previous audio questions submitted. The method provides any user with a mobile device that can wirelessly connect within a venue to use their mobile devices to proffer questions in the form of vocal questions or text questions to a moderator. The method includes receiving the vocal questions and mixing a watermark audio signal with the question before broadcasting the question to the audience. The mixed question and watermark audio signals the phone receives from earlier submitted questions are automatically subtracted from the audio stream so that only the question without the background multimedia reinforcement speaker audio stream is sent. In this way, the audio signals may be modified to differentiate an audience comment from a presenter comment. By the addition of the watermark audio signal, a clean signal may be extracted by the system. The audio visual signals from the participants may be a multi-duplex communication.

Figure 14:
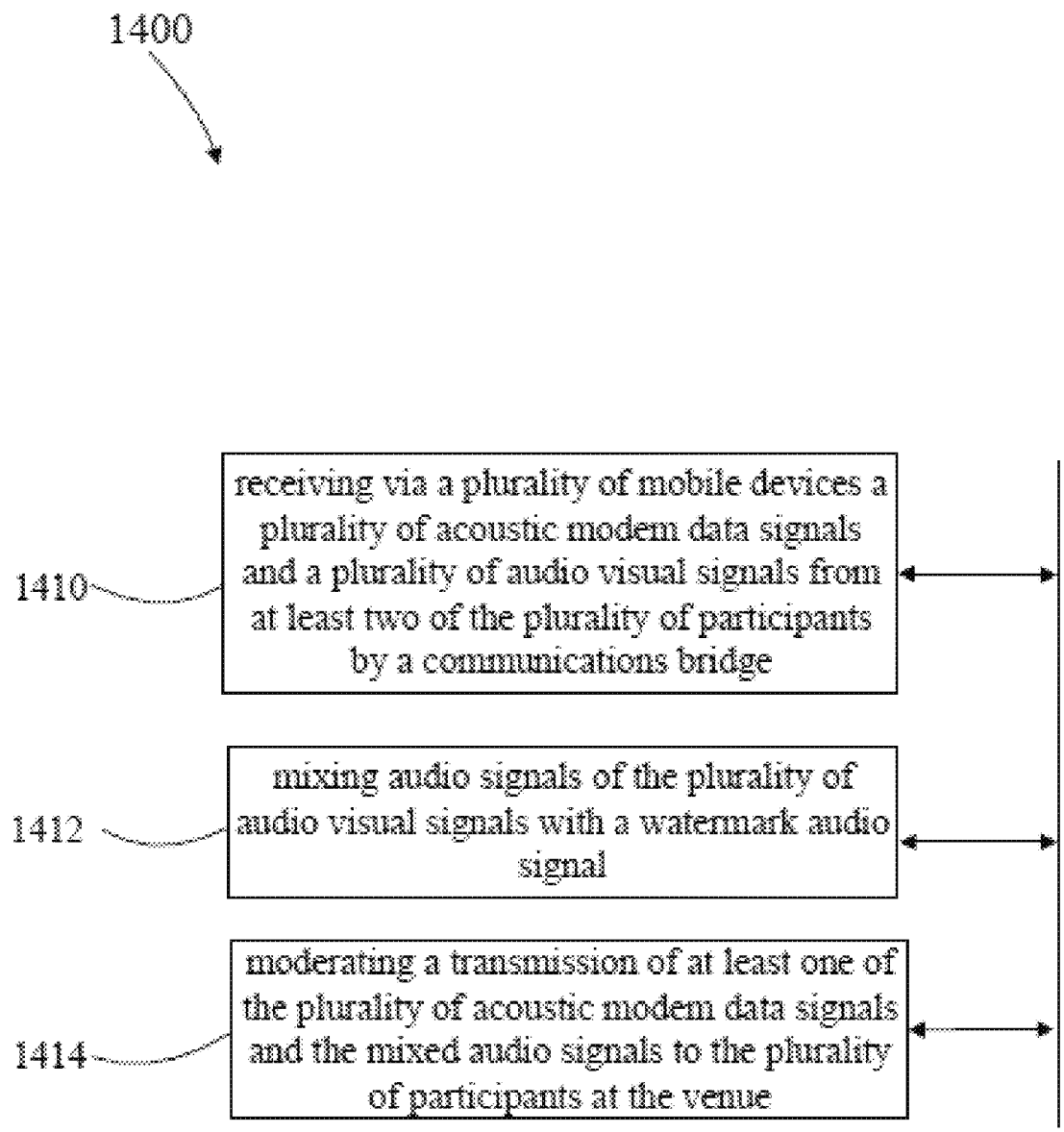
FIG. 14 depicts another example method for centrally controlling communication at a venue, in accordance with some embodiments.

FIG. 14 depicts a method or non-transitory computer readable storage medium configured to store instructions for execution by a processor for centrally controlling communication 1400 at a venue with a plurality of participants. The method may include receiving 1410 via a plurality of mobile devices a plurality of acoustic modem data signals and a plurality of audio visual signals from at least two of the plurality of participants by a communications bridge, mixing audio 1412 signals of the plurality of audio visual signals with a watermark audio signal and moderating 1414 a transmission of at least one of the plurality of acoustic modem data signals and the mixed audio signals to the plurality of participants at the venue. The moderated transmission is communicated to the participants and the audience by way of a multimedia reinforcement speaker system (see FIG. 1 element 122).

The method of FIG. 14 is similar to that of FIG. 13 with the inclusion of communicating data by acoustic modem data signals. The method may further include receiving text messages via the plurality of acoustic modem data signals and converting the received text message to speech for moderated transmission.

Figure 15:
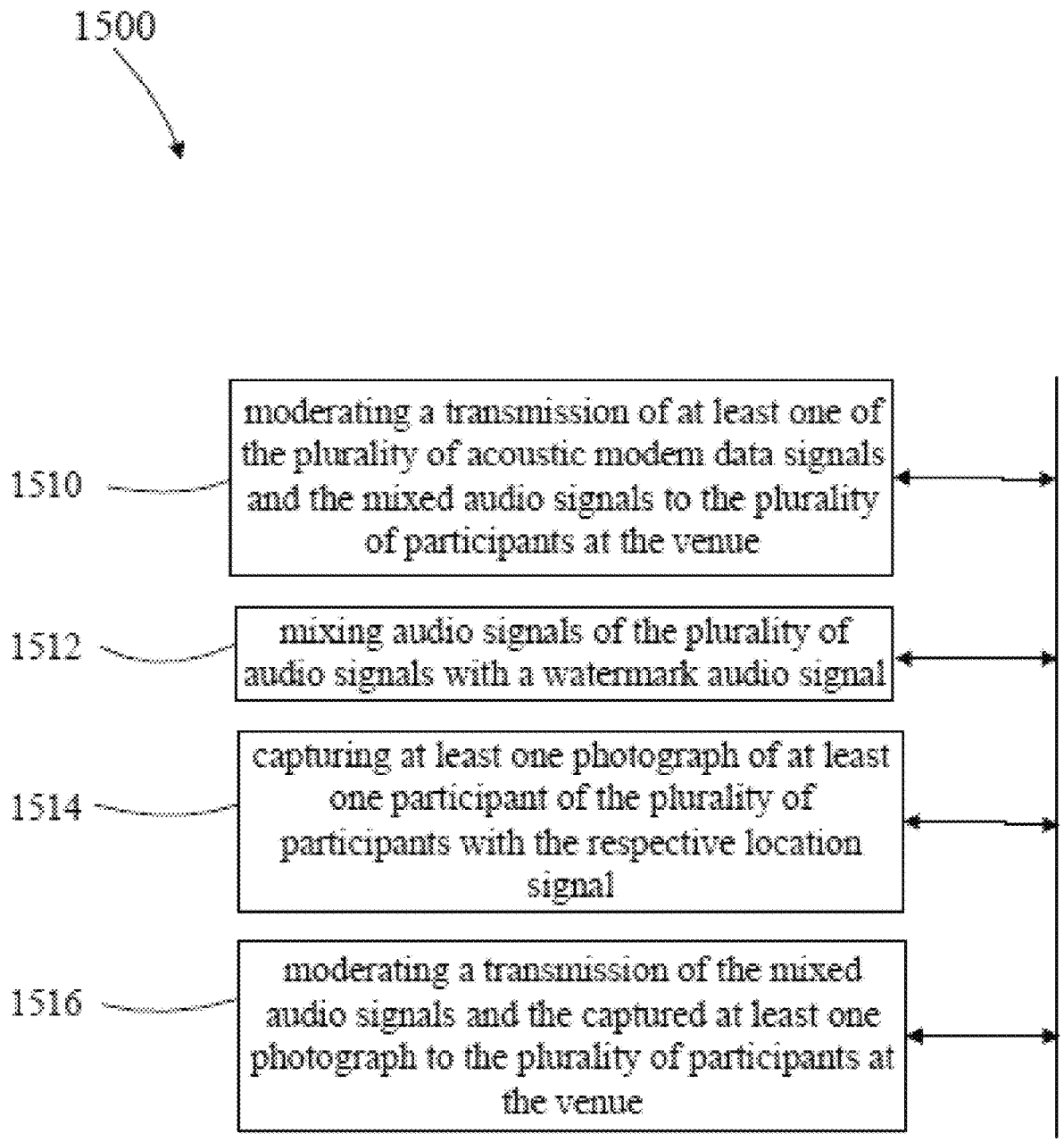
FIG. 15 depicts another example method for centrally controlling communication at a venue, in accordance with some embodiments.

FIG. 15 illustrates a method or non-transitory computer readable storage medium configured to store instructions for execution by a processor for centrally controlling communication 1500 at a venue with a plurality of participants. The method may include receiving 1510 via a plurality of mobile devices a respective plurality of audio signals and a respective plurality of location signals from at least two of the plurality of participants by a communications bridge, mixing 1512 audio signals of the plurality of audio signals with a watermark audio signal, capturing 1514 at least one photograph of at least one participant of the plurality of participants with the respective location signal and moderating 1516 a transmission of the mixed audio signals and the captured at least one photograph to the plurality of participants at the venue. The moderated transmission is communicated to the participants and the audience by way of a multimedia reinforcement speaker system (See FIG. 1 element 122).

The method of FIG. 15 is similar to the method of FIG. 9 with the addition of photographs added to the previous audio questions.

Figure 16:
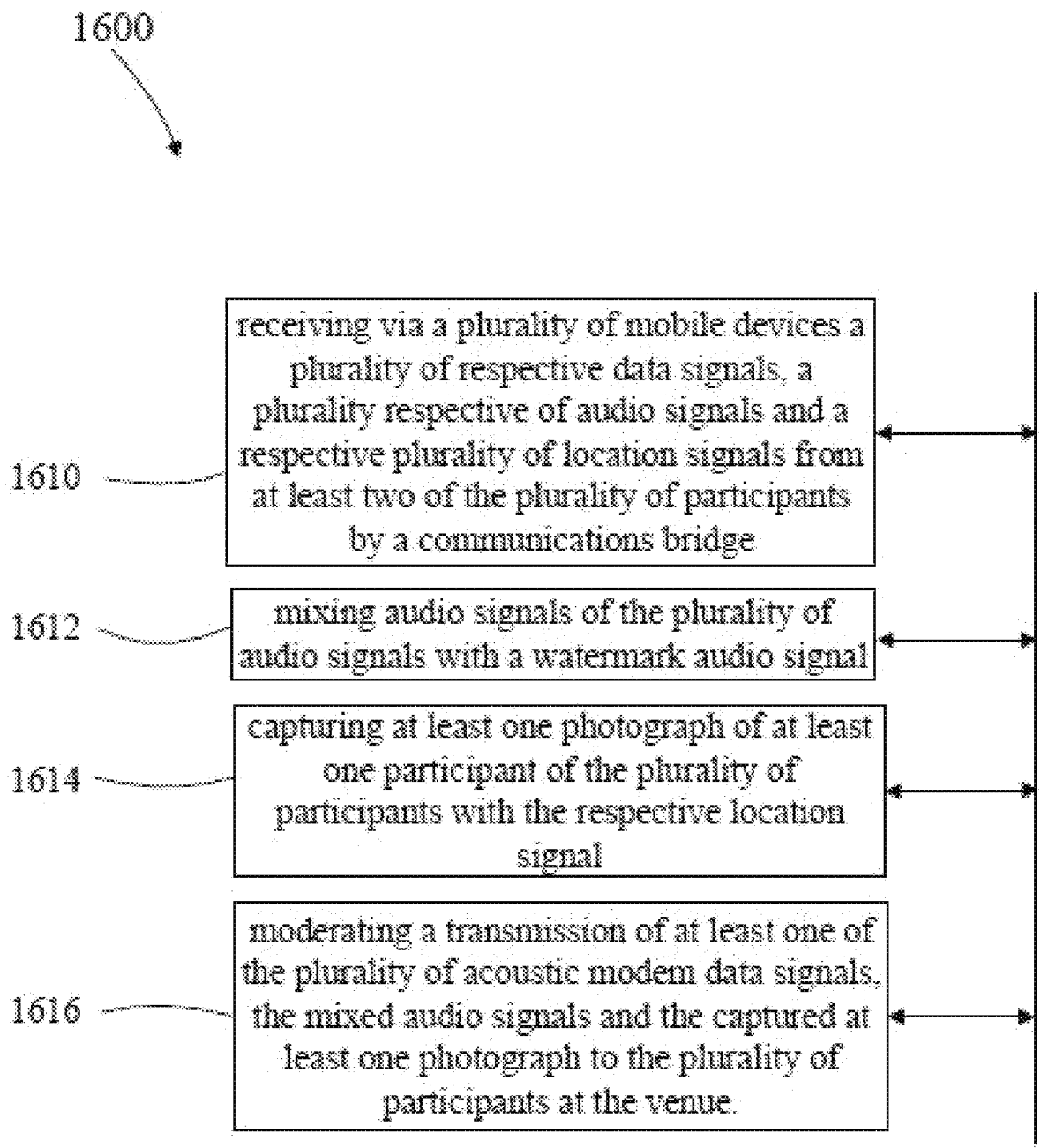
FIG. 16 depicts another example method for centrally controlling communication at a venue, in accordance with some embodiments.

FIG. 16 depicts a method or non-transitory computer readable storage medium configured to store instructions for execution by a processor for centrally controlling communication 1600 at a venue with a plurality of participants. The method may include receiving 1610 via a plurality of mobile devices a plurality of respective data signals, a plurality respective of audio signals and a respective plurality of location signals from at least two of the plurality of participants by a communications bridge, mixing 1612 audio signals of the plurality of audio signals with a watermark audio signal and capturing 1614 at least one photograph of at least one participant of the plurality of participants with the respective location signal and moderating 1616 a transmission of at least one of the plurality of acoustic modem data signals, the mixed audio signals and the captured at least one photograph to the plurality of participants at the venue. The moderated transmission is communicated to the participants and the audience by way of a multimedia reinforcement speaker system (See FIG. 1 element 122).

The method of FIG. 16 is similar to the method of FIG. 10 with the addition of photographs added to the previous audio questions.

Figure 17:
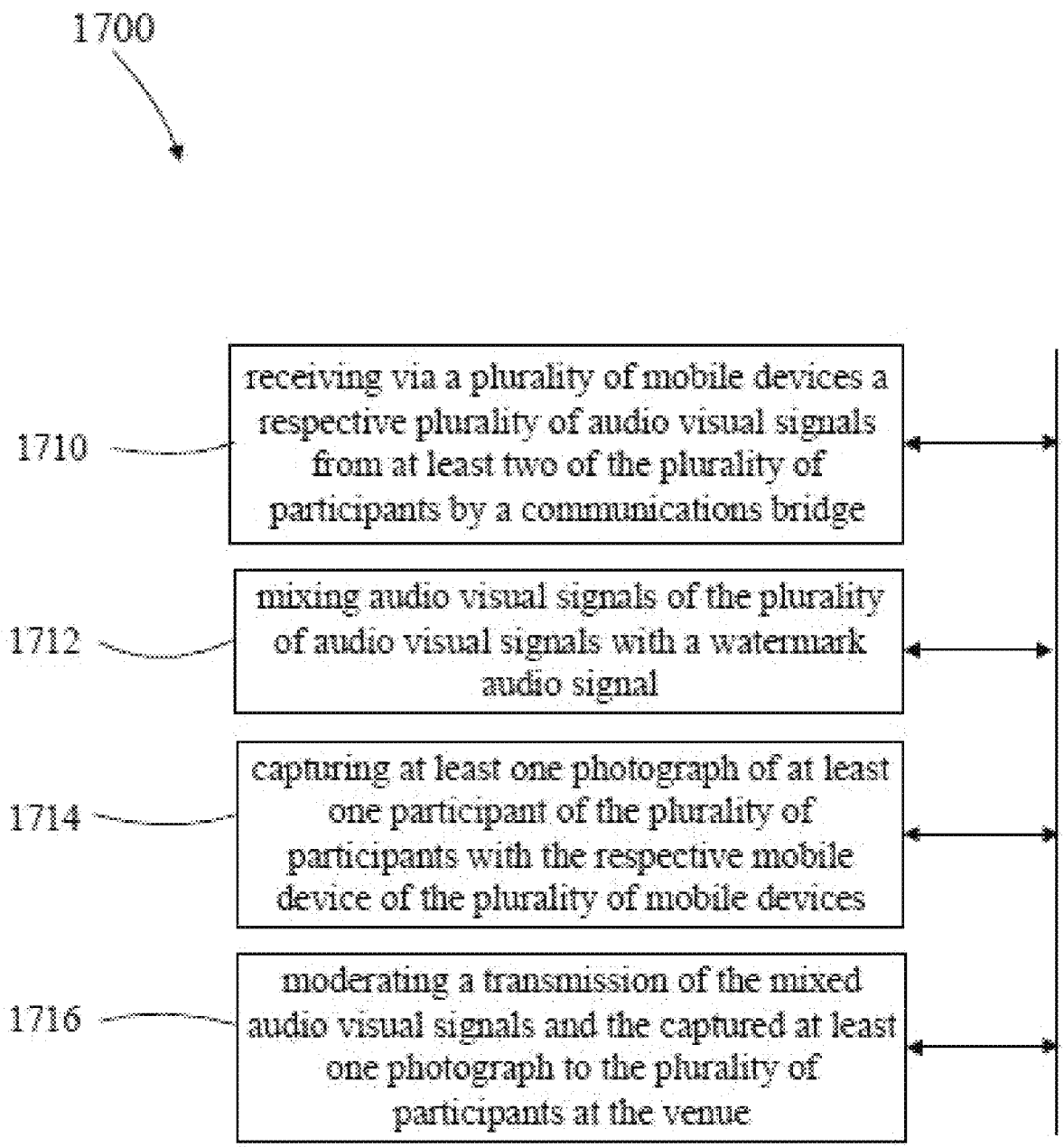
FIG. 17 depicts another example method for centrally controlling communication at a venue, in accordance with some embodiments.

FIG. 17 illustrates a method or non-transitory computer readable storage medium configured to store instructions for execution by a processor for centrally controlling communication 1700 at a venue with a plurality of participants. The example method may include receiving 1710 via a plurality of mobile devices a respective plurality of audio visual signals from at least two of the plurality of participants by a communications bridge, mixing 1712 audio visual signals of the plurality of audio visual signals with a watermark audio signal, capturing 1714 at least one photograph of at least one participant of the plurality of participants with the respective mobile device of the plurality of mobile devices and moderating 1716 a transmission of the mixed audio visual signals and the captured at least one photograph to the plurality of participants at the venue. The moderated transmission is communicated to the participants and the audience by way of a multimedia reinforcement speaker system (see FIG. 1 element 122).

The method of FIG. 17 is similar to the method of FIG. 13 with the addition of photographs added to the previous audio questions.

Figure 18:
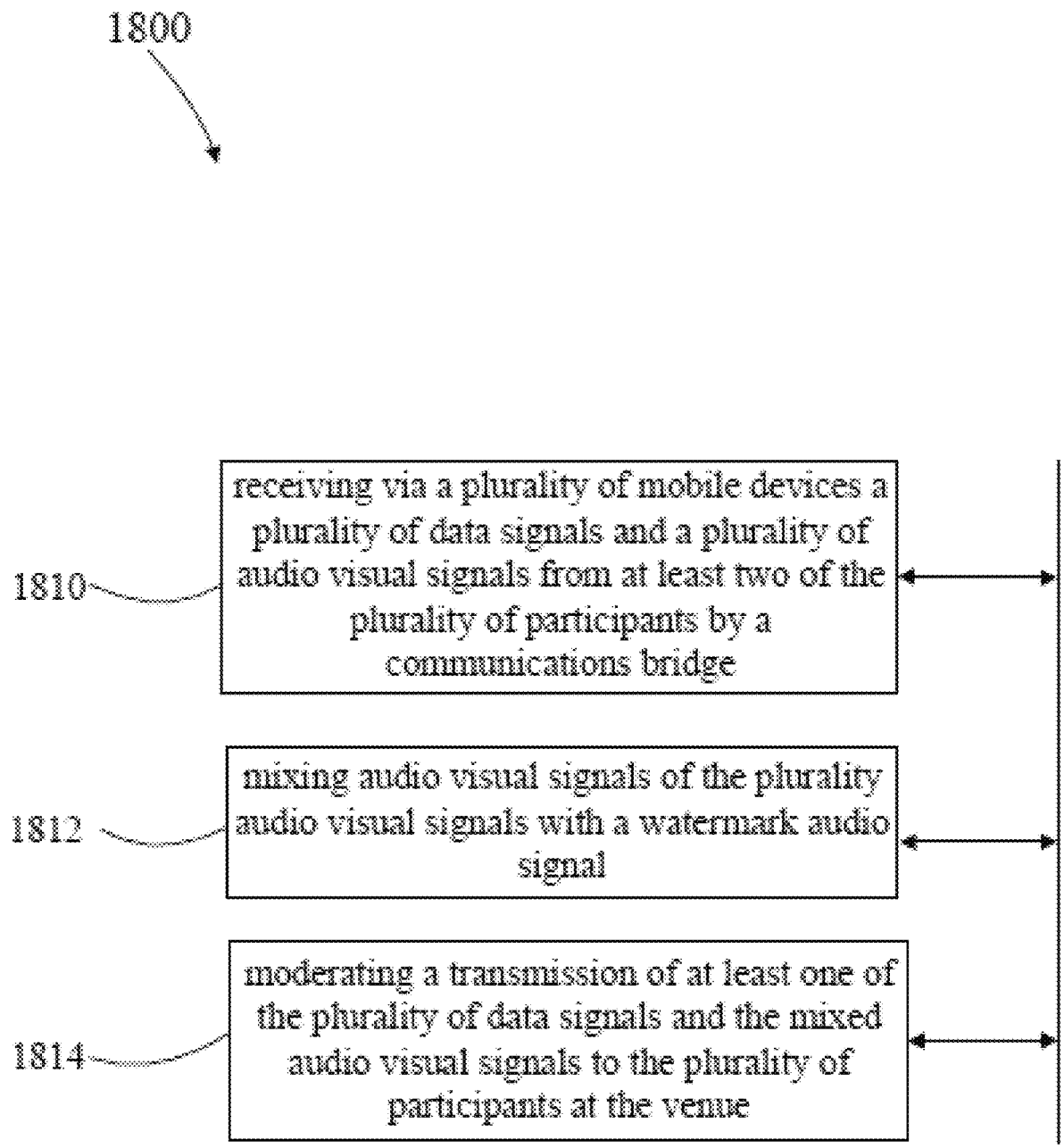
FIG. 18 depicts another example method for centrally controlling communication at a venue, in accordance with some embodiments.

FIG. 18 illustrates a method or non-transitory computer readable storage medium configured to store instructions for execution by a processor for centrally controlling communication 1800 at a venue with a plurality of participants. The method may include receiving 1810, via a plurality of mobile devices, a plurality of data signals and a plurality of audio visual signals from at least two of the plurality of participants by a communications bridge, mixing 1812 audio visual signals of the plurality audio visual signals with a watermark audio signal and moderating 1814 a transmission of at least one of the plurality of data signals and the mixed audio visual signals to the plurality of participants at the venue. The moderated transmission is communicated to the participants and the audience by way of a multimedia reinforcement speaker system (See FIG. 1 element 122).

The method of FIG. 18 is similar to the method of FIG. 14 with the addition of photographs added to the previous audio questions.

Figure 19:
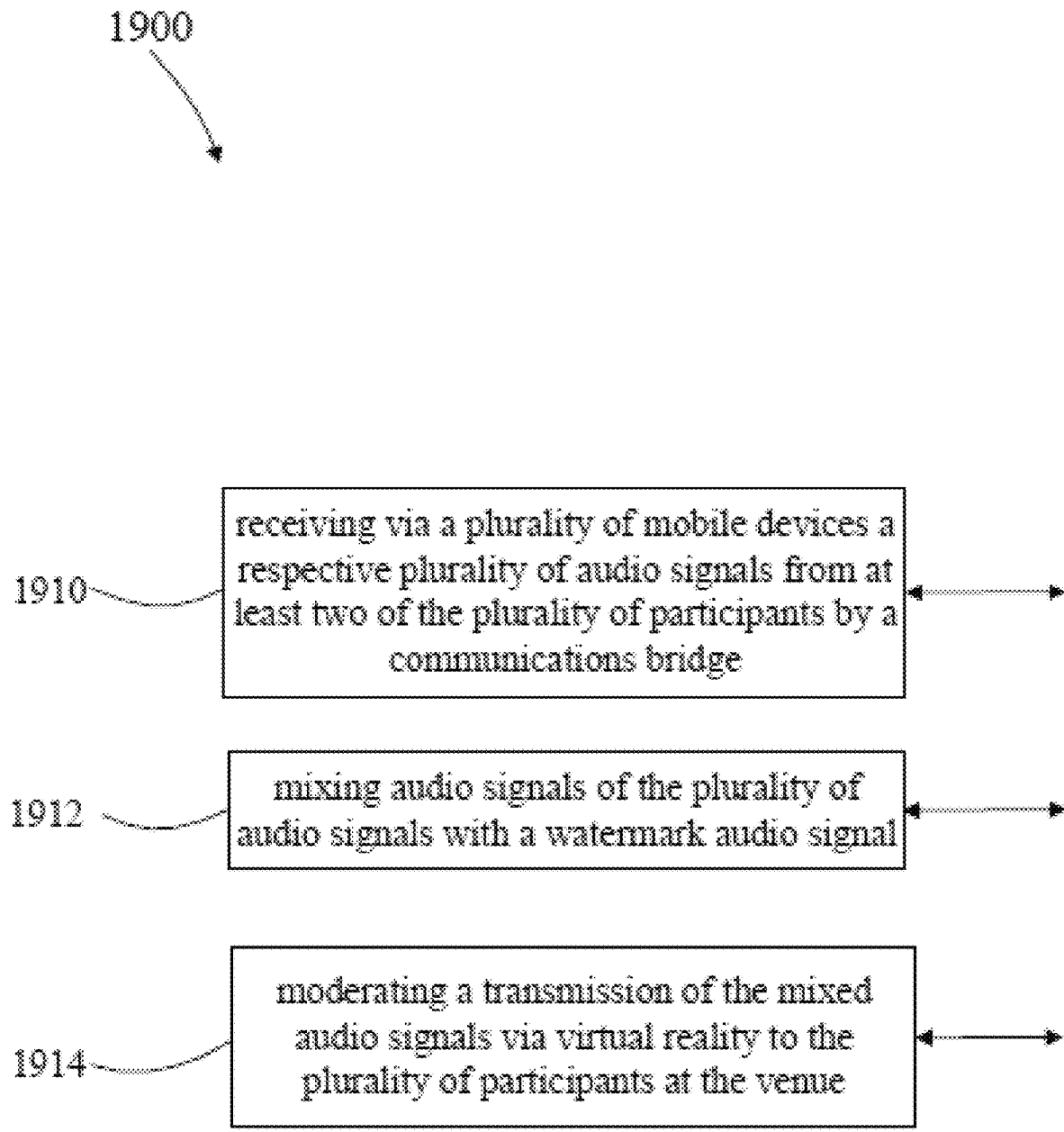
FIG. 19 depicts another example method for centrally controlling communication at a venue, in accordance with some embodiments.

FIG. 19 depicts a method or non-transitory computer readable storage medium configured to store instructions for execution by a processor for centrally controlling communication 1900 at a venue with a plurality of participants. The method may include receiving 1910 via a plurality of mobile devices a respective plurality of audio signals from at least two of the plurality of participants by a communications bridge, mixing 1912 audio signals of the plurality of audio signals with a watermark audio signal and moderating 1914 a transmission of the mixed audio signals via virtual reality to the plurality of participants at the venue. The moderated transmission is communicated to the participants and the audience by way of a multimedia reinforcement speaker system (see FIG. 1 element 122).

The method of FIG. 19 is similar to the method of FIG. 9 with the addition of virtual reality for the participants.

Figure 20:
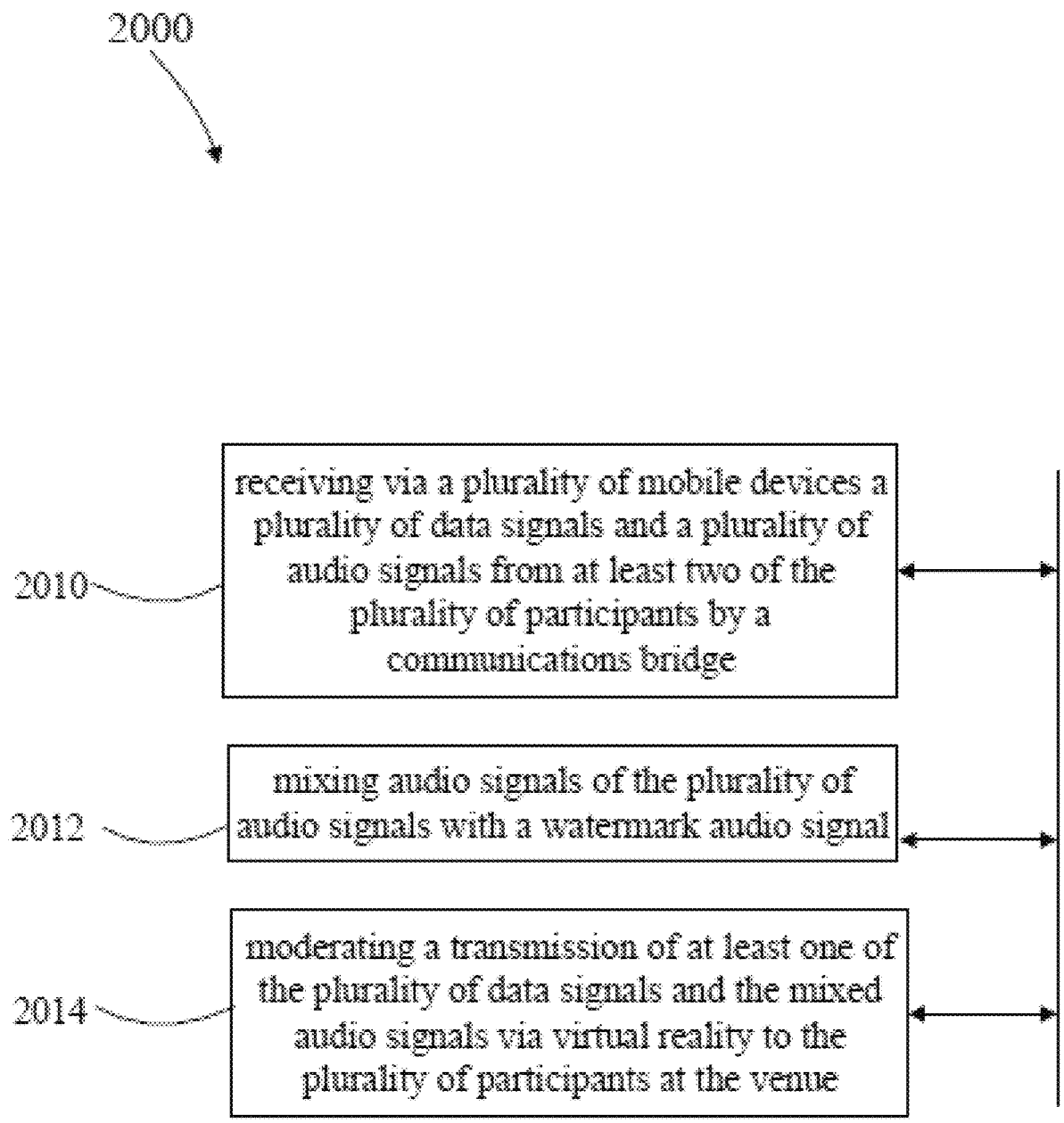
FIG. 20 depicts another example method for centrally controlling communication at a venue, in accordance with some embodiments.

FIG. 20 depicts a method or non-transitory computer readable storage medium configured to store instructions for execution by a processor for centrally controlling communication 2000 at a venue with a plurality of participants. The method may include receiving 2010 via a plurality of mobile devices a plurality of data signals and a plurality of audio signals from at least two of the plurality of participants by a communications bridge, mixing 2012 audio signals of the plurality of audio signals with a watermark audio signal and moderating 2014 a transmission of at least one of the plurality of data signals and the mixed audio signals via virtual reality to the plurality of participants at the venue. The moderated transmission is communicated to the participants and the audience by way of a multimedia reinforcement speaker system (See FIG. 1 element 122).

The method of FIG. 20 is similar to the method of FIG. 10 with the addition of virtual reality for the participants.

Figure 21:
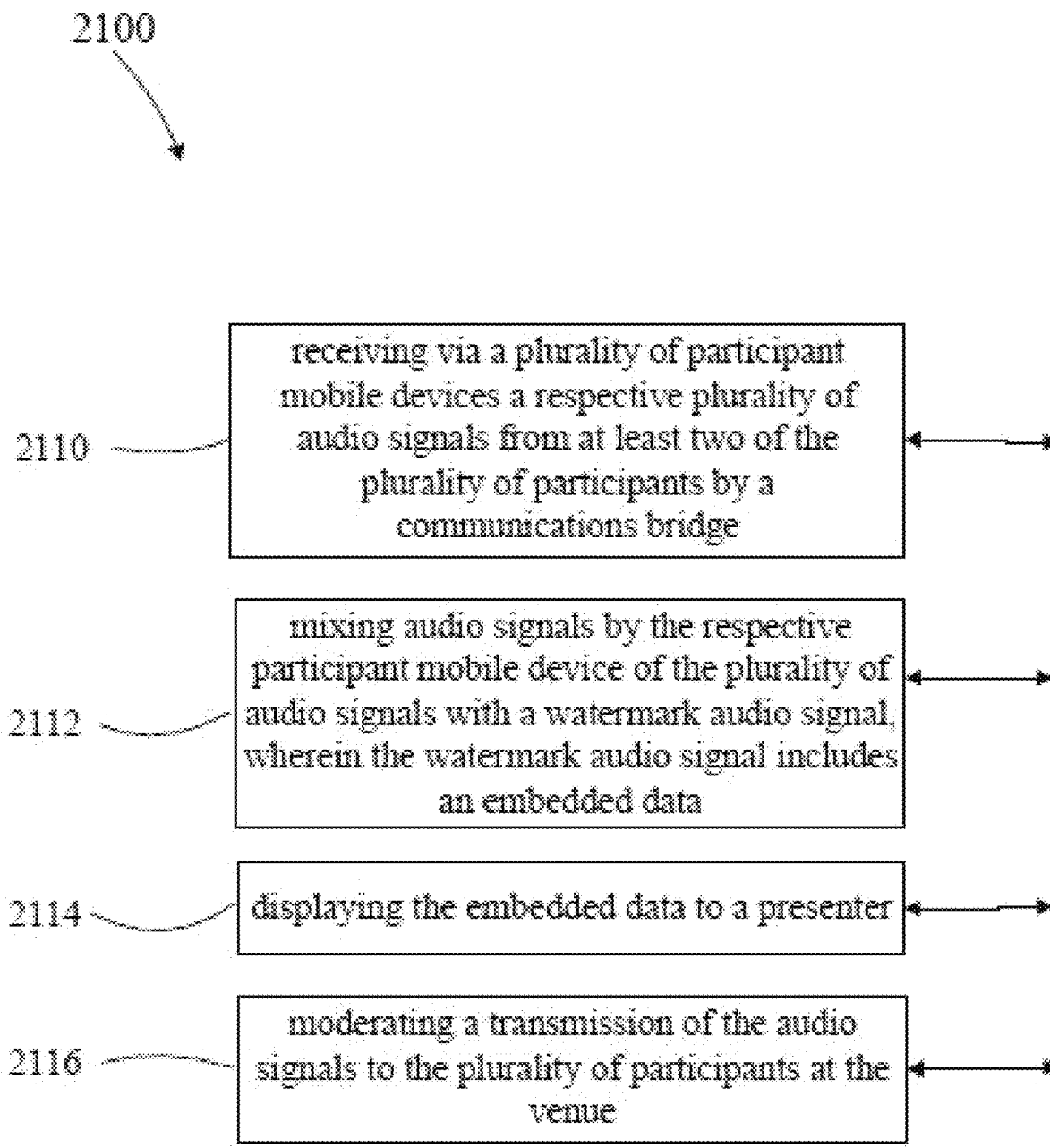
FIG. 21 depicts another example method for centrally controlling communication at a venue, in accordance with some embodiments.

FIG. 21 depicts a method or non-transitory computer readable storage medium configured to store instructions for execution by a processor for centrally controlling communication 2100 at a venue with a plurality of participants. The method may include receiving 2110 via a plurality of participant mobile devices a respective plurality of audio signals from at least two of the plurality of participants by a communications bridge, mixing 2112 audio signals by the respective participant mobile device of the plurality of audio signals with a watermark audio signal, and the watermark audio signal includes an embedded data, displaying 2114 the embedded data to a presenter and moderating 2116 a transmission of the audio signals to the plurality of participants at the venue. The moderated transmission is communicated to the participants and the audience by way of a multimedia reinforcement speaker system (See FIG. 1 element 122).

Figure 22:
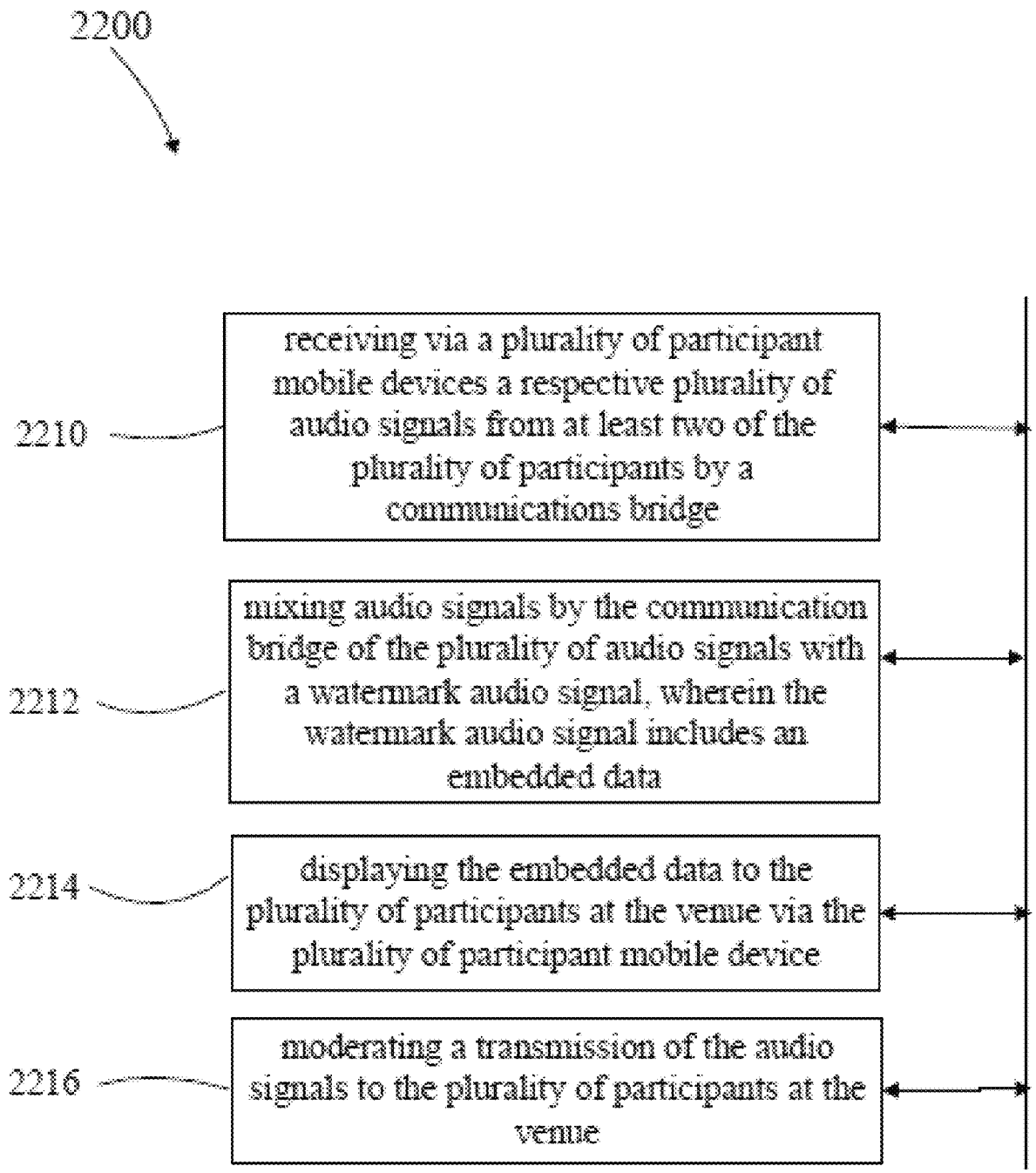
FIG. 22 depicts another example method for centrally controlling communication at a venue, in accordance with some embodiments.

FIG. 22 depicts a method or non-transitory computer readable storage medium configured to store instructions for execution by a processor for centrally controlling communication 2200 at a venue with a plurality of participants. The method may include receiving 2210 via a plurality of participant mobile devices a respective plurality of audio signals from at least two of the plurality of participants by a communications bridge, mixing 2212 audio signals by the communication bridge of the plurality of audio signals with a watermark audio signal, and the watermark audio signal includes an embedded data, displaying 2214 the embedded data to the plurality of participants at the venue via the plurality of participant mobile devices and moderating 2216 a transmission of the audio signals to the plurality of participants at the venue. The moderated transmission is communicated to the participants and the audience by way of a multimedia reinforcement speaker system (See FIG. 1 element 122).

Figure 23:
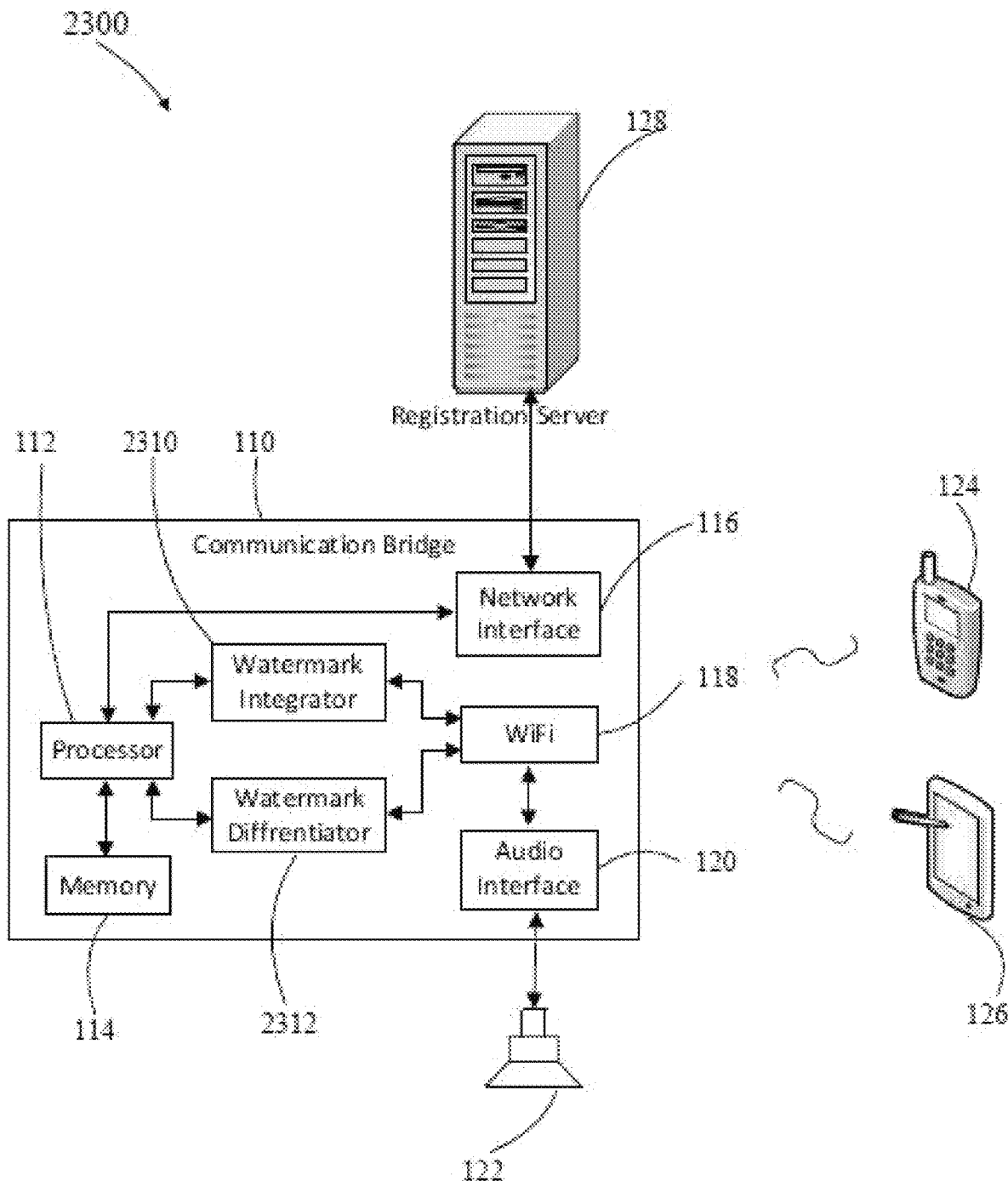
FIG. 23 depicts a system for centrally controlling communication at a venue, in accordance with some embodiments.

FIG. 23 depicts a second overall system diagram 2300, which includes a communications bridge 110 that includes at least a processor 112 coupled to a memory 114 that includes a non-transitory computer readable storage medium. The processor 112 is coupled to an audio watermark integrator 2310 and an audio watermark differentiator 2312, a network interface 116. The audio watermark integrator 2310 embeds watermarks in the audio heard by the participants' mobile devices 124. The embedded watermarks contain data that is recognized by the codec in the participant mobile device, such as closed captioning. The audio watermark differentiator 2312 receives audio watermarks embedded in the communications from the participants' mobile devices containing data that is recognized by the audio watermark differentiator for communication to the processor. The audio watermark integrator 2310 and audio watermark differentiator 2312 are coupled to the WiFi interface 118 and the audio interface 120. The network interface 116 is coupled to a registration server 128. In one embodiment, the coupling is by direct line connection via a corporate LAN, in other embodiments the connection may be by WLAN or cellular communication. The audio interface 120 is coupled to a multimedia reinforcement system 122. A participant mobile device 124 is wirelessly coupled to the WiFi interface, or may be coupled by a cellular connection. The presenter mobile device 126 is coupled to the WiFi interface 118 or may be coupled by direct line connection.

Figure 24:
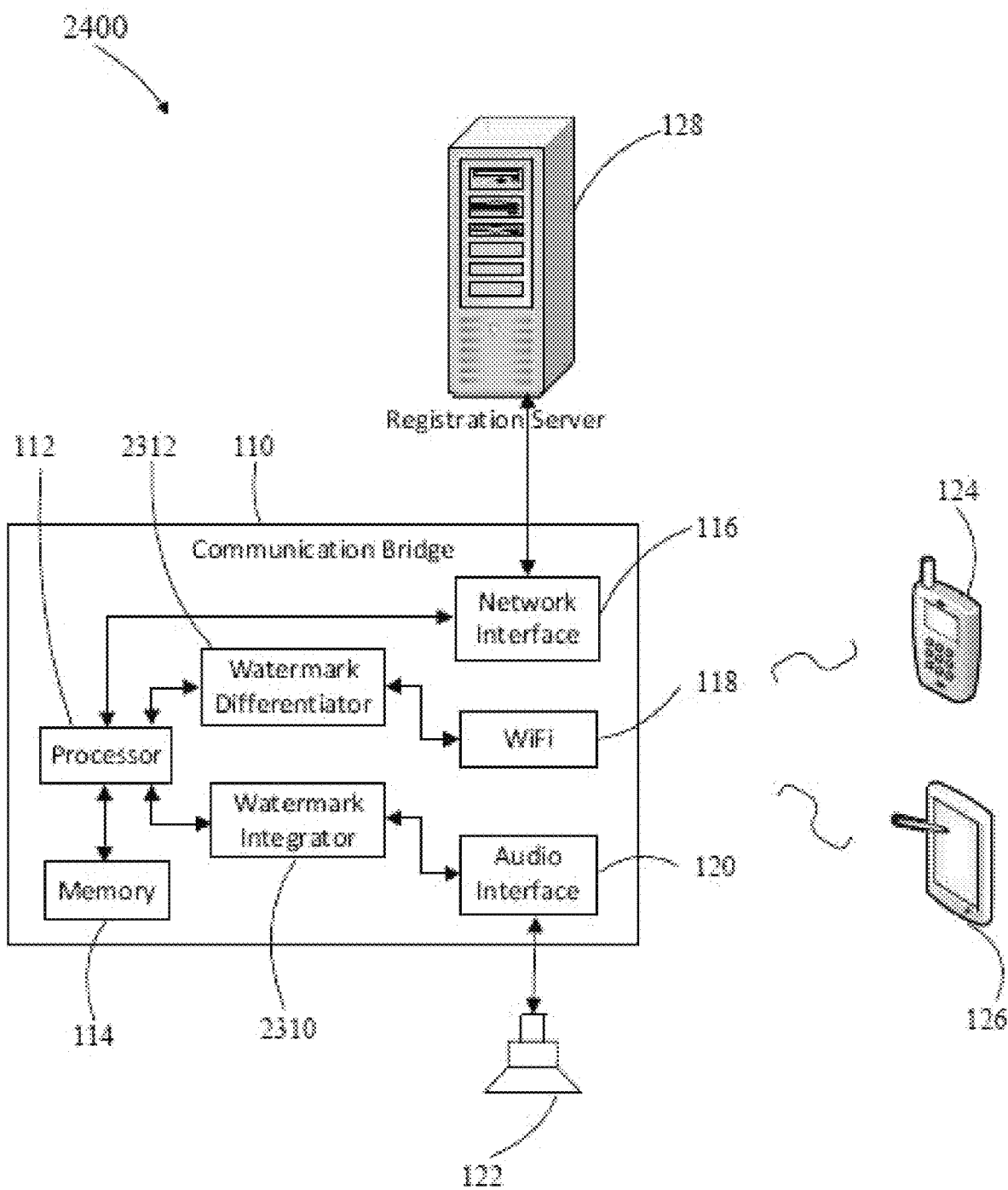
FIG. 24 depicts a system for centrally controlling communication at a venue, in accordance with some embodiments.

FIG. 24 depicts another system diagram 2400, which includes a communications bridge 110 is comprised of at least a processor 112 coupled to a memory 114 that includes a non-transitory computer readable storage medium. The processor 112 coupled to an audio watermark integrator 2310, an audio watermark differentiator 2312 and a network interface 116. The audio watermark integrator 2310 embeds watermarks in the audio heard by the participant's mobile devices 124. The embedded watermarks contain data that is recognized by the codec in the participant mobile device, such as closed captioning. The audio watermark differentiator 2312 receives audio watermarks embedded in the communications from the participants' mobile devices containing data that is recognized by the audio watermark differentiator for communication to the processor. The audio watermark integrator 2310 is coupled to the audio interface 120. The audio watermark differentiator 2312 is coupled to the WiFi interface 118. The network interface 116 is coupled to a registration server 128. In one embodiment, the coupling is by direct line connection via a corporate LAN, in other embodiments the connection may be by WLAN or cellular communication. The audio interface 120 is coupled to a multimedia reinforcement system 122. A participant mobile device 124 is wirelessly coupled to the WiFi interface, or may be coupled by way of cellular connection. The presenter mobile device 126 is coupled to the WiFi interface 118 or may be coupled by direct line connection.

Figure 25:
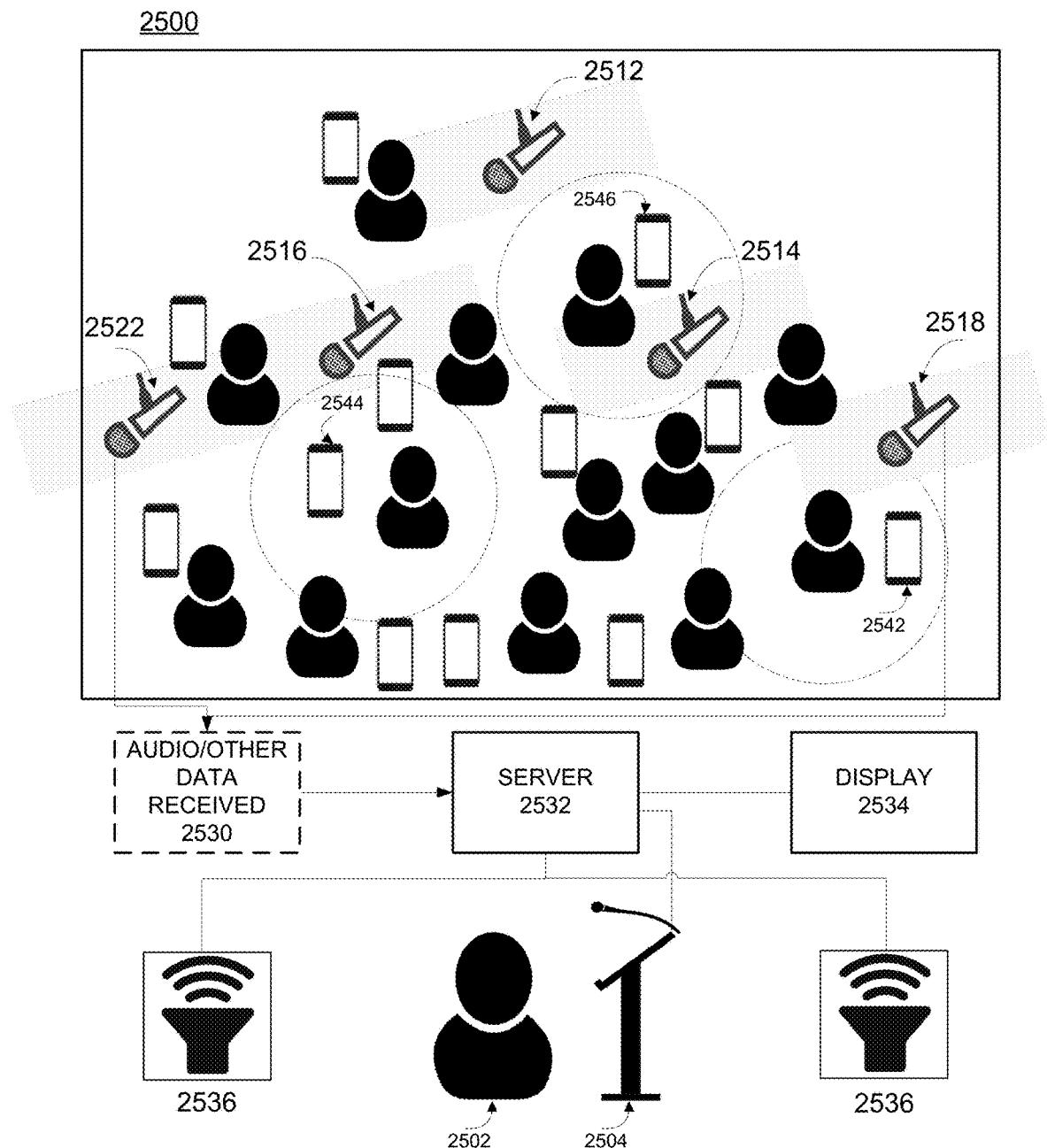
FIG. 25 illustrates a system for receiving and processing audience member audio and related data for communication at a venue, in accordance with some embodiments.

FIG. 25 illustrates a system for receiving and processing audience member audio and related data for communication at a venue, in accordance with some embodiments. Referring to FIG. 25, the configuration 2500 demonstrates a group of persons attending a live presentation by a presenter 2502 using a microphone 2504 and loudspeaker 2536 system. In this configuration, many persons are present at a live speaker assembly. The venue may have outfitted with various microphones 2512-2522 and loudspeakers 2536 to record audience voice audio for when persons are speaking to ask questions. In another example, the mobile devices of the users, such as 2544/2543, etc., may be used to record user voice and submit the data wirelessly via the application and submit the data to the server 2532, the user voice data and other data may be submitted 2530, such as location data, user profile data, time information, etc. If the data is identified as a question, it may be displayed in the display 2534 in the order it was received.

In one example, a user that is at a location that is near a microphone 2516, the voice may be captured via the microphone 2516 when the user asks a question at a particular time in a personal tone that does not include the attention of those around the user or the speaker, such as a quieter tone that is only identifiable by the local microphone 2516 and/or the user's personal computing device 2544.

In general, the user's may watch the content of the presentation on the display 2534 or their personal computing devices which may be actively following the video and/or audio of the presentation. The users may be located in the conference venue, outside the conference venue, in a remote location etc. The user's may ask questions and make comments at any time by speaking into their mobile devices 2544/2546/2542, etc. The comments/questions can be received along with any other sound captured, combined with other data, such as watermark data identifying a location of the user device, a name/profile of the user, date/time, etc. The information may be bundled a "audio" data or a combination of audio data and non-audio data, then sent to the server 2532 which may queue the data in a live queue on the display 2534, to demonstrate the questions submitted in the order they are received. When the presenter 2502 decides to address questions, the list of pending questions can be addressed in turn. The user's voice can be played to the venue via the loudspeakers 2536 as it is recorded. Additional processing may be performed to remove background noise and other voices so the audio is clear. The audio can be played through the loudspeakers when the questions are initiated by the user controlling the moderation of the engagement.

Figure 26:
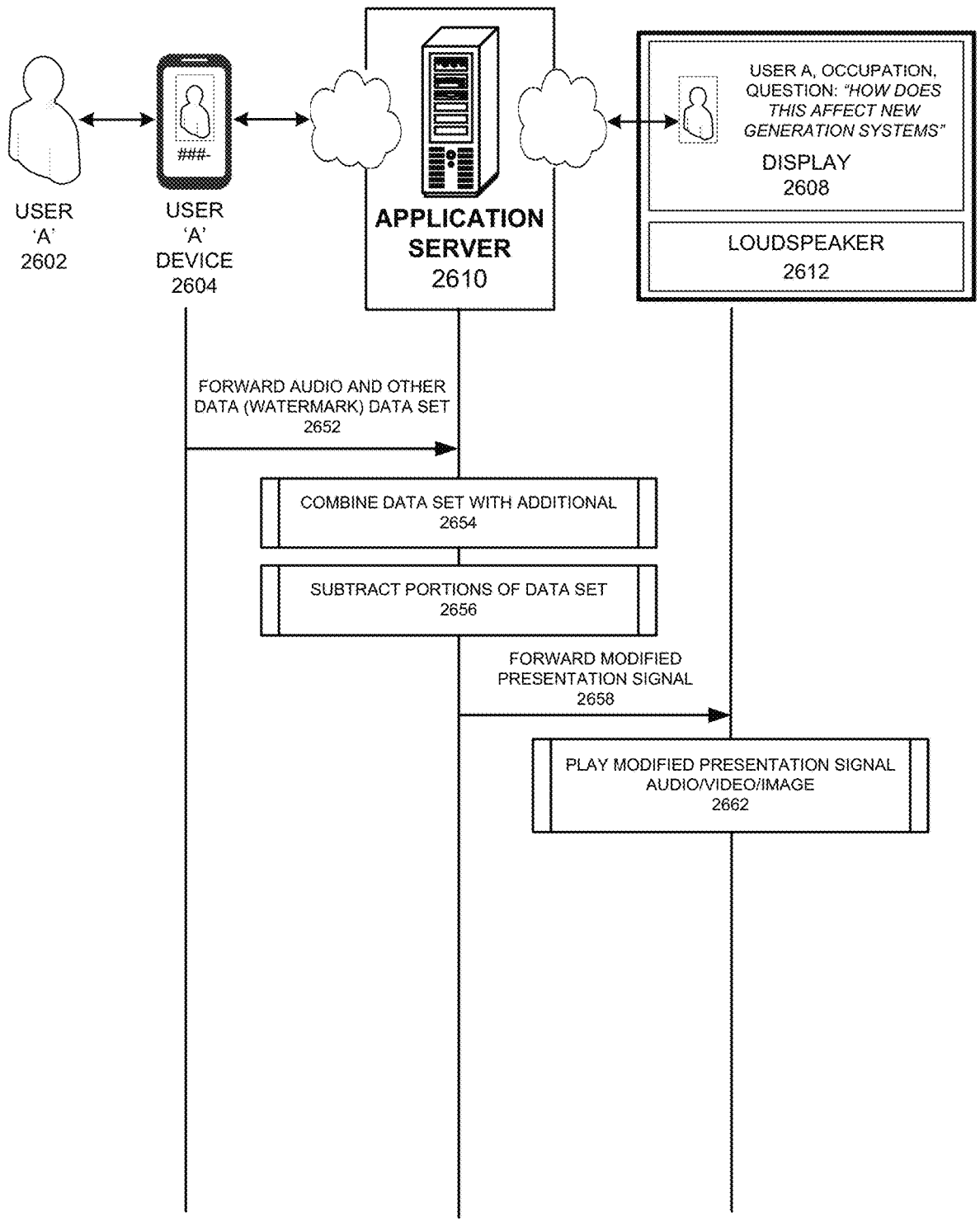
FIG. 26 illustrates a system signaling diagram for receiving and processing audience member audio and related data for communication at a venue, in accordance with some embodiments.

FIG. 26 illustrates a system signaling diagram for receiving and processing audience member audio and related data for communication at a venue, in accordance with some embodiments. Referring to FIG. 26, the example process 2600 includes a user 'A' 2602 operating a user device 2604 to watch, connect and provide input to a live presentation. The user device may be used with the presentation application to capture live audio spoken by the user and forward the data set 2652 in a send operation along with other "watermark" data, such as user information, time, date, location of user device, purpose, title of user, title of message, etc., to an application server 2610 so the data can be received as a combined data set 2654. The data set may have unwanted audio data, such as background noise identified by a particular frequency and/or amplitude and may need to be subtracted 2656 to clarify the primary purpose of the audio which is likely to be the user's voice only. In this case, the audio data may be filtered to remove a noise floor, other voices, undesired noises, etc. The modified signal can then be forwarded to a presentation device, such as a display 2608 and/or a loudspeaker 2612. As the signal has unwanted audio data removed to create the modified presentation signal, then the modified presentation signal 2658 is forwarded and queued or played on a presentation device as audio, images, video, etc. 2662. The ideal scenario may be a question that includes video and audio of the user asking the question prior to the question and video display of the user speaking being presented. However, other data may be shared, such as a link, a photograph, a document, etc.

Figure 27:
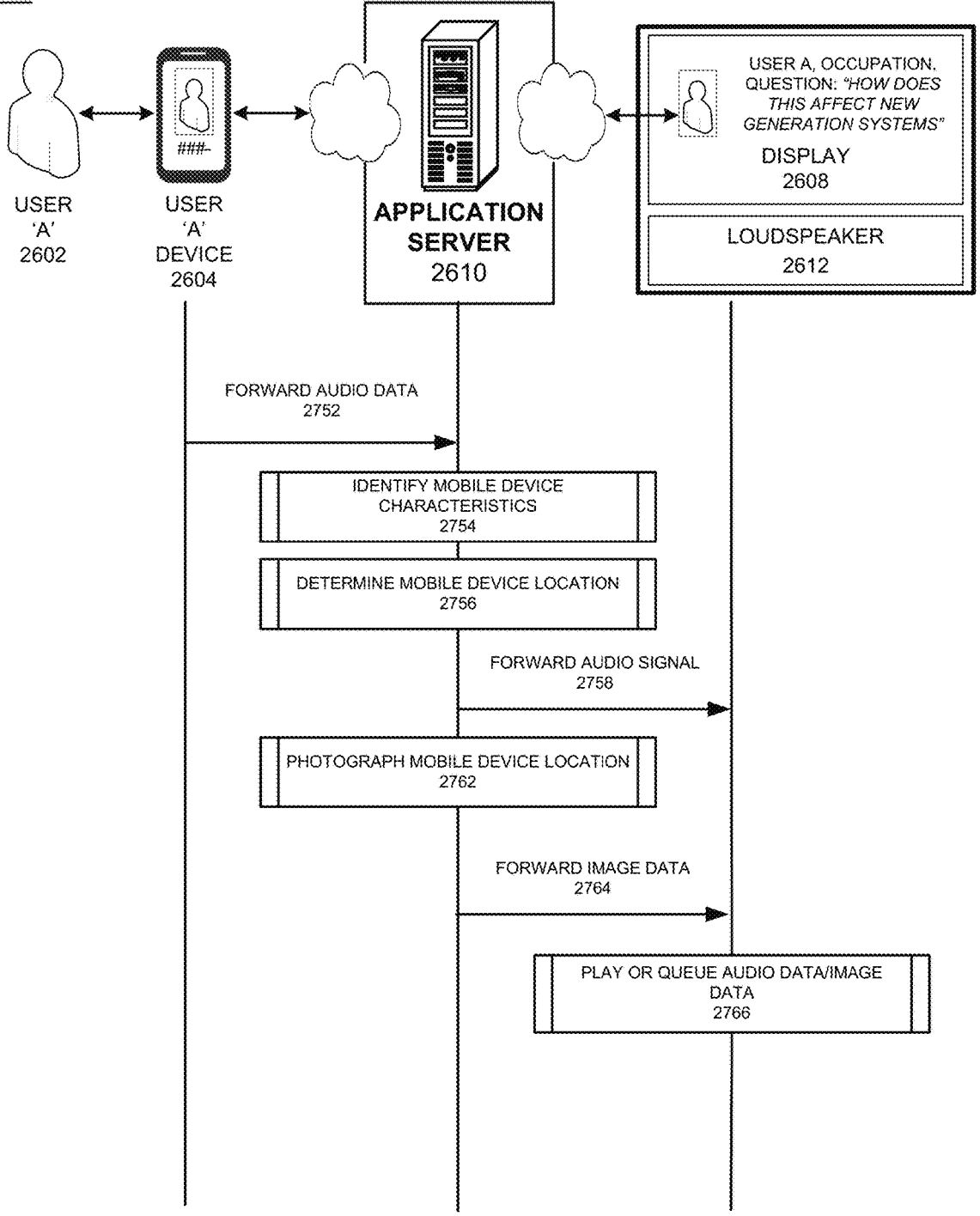
FIG. 27 illustrates another system signaling diagram for receiving and processing audience member audio and related data for communication at a venue, in accordance with some embodiments.

FIG. 27 illustrates another system signaling diagram for receiving and processing audience member audio and related data for communication at a venue, in accordance with some embodiments. Referring to FIG. 27, the configuration 2700 includes another scenario where the audio data of the user device 2604 is captured and forwarded 2752 to the server 2610. The mobile device characteristics 2754 may be identified by determining the mobile device model based on hardware identification information included in the audio data messages received.

Once a model of the device is known, the audio characteristics of the device may be anticipated by applying gain, filters, and other audio modification techniques to the audio received from the known device model. Also, the device location 2756 may be used to provide accurate audio tuning data based on known audio characteristics of the venue. Alternatively, other features may be provided such as turning on microphones near the location of the user device (e.g., 2516 in FIG. 25) when the question is presented to the audience so the user device 2544 and user can interact with the speaker 2502 while other microphones in the venue are turned down/off to drown out noise.

Once the audio signal data is captured and forwarded 2758, the mobile device location may be photographed 2762 to identify the user and pair the photograph with the captured audio data by forwarding the image data 2764 to the display 2608 and loudspeaker 2612 to queue the data or play the data when the time matures to play the data 2766 to the audience.

Figure 28:
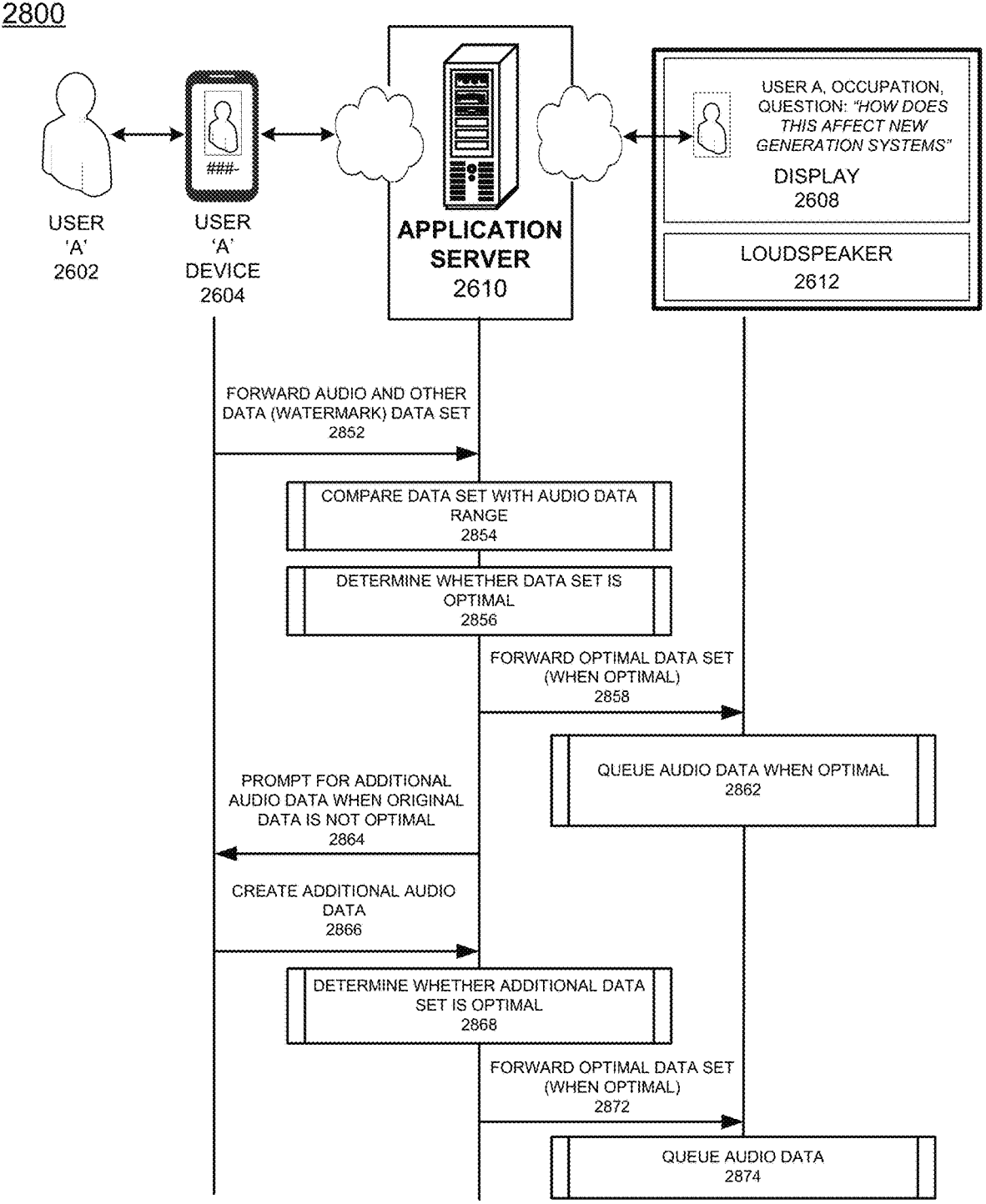
FIG. 28 illustrates another system signaling diagram for receiving and processing audience member audio and related data for communication at a venue, in accordance with some embodiments.

FIG. 28 illustrates another system signaling diagram 2800 for receiving and processing audience member audio and related data for communication at a venue, in accordance with some embodiments. Referring to FIG. 28, the configuration provides forwarding audio data and other data (watermark data) 2852 to the application server 2610. The server may compare the data set to an audio data range 2854 to determine whether the audio data is acceptable for post-processing presentation 2856. If the data is within a target comparison level, such as within 10 percent of the expected audio data range of frequency, amplitude, reduced background noise, etc., then the data may be considered optimal and may be forwarded 2858 and queued 2862 for subsequent presentation purposes. When the data is determined to be less than optimal, the user device may be prompted for additional audio data 2864. The user device may present a display prompt to the user 2802 to re-attempt the audio data, the additional audio data 2866 may then be received and screened for additional screening purposes 2868 and to test for optimal quality. When the data is optimal and matches data quality criteria 2872, then the data is sent to the data queue 2874 until the moderator can access the data for presentation purposes.

Figure 29:
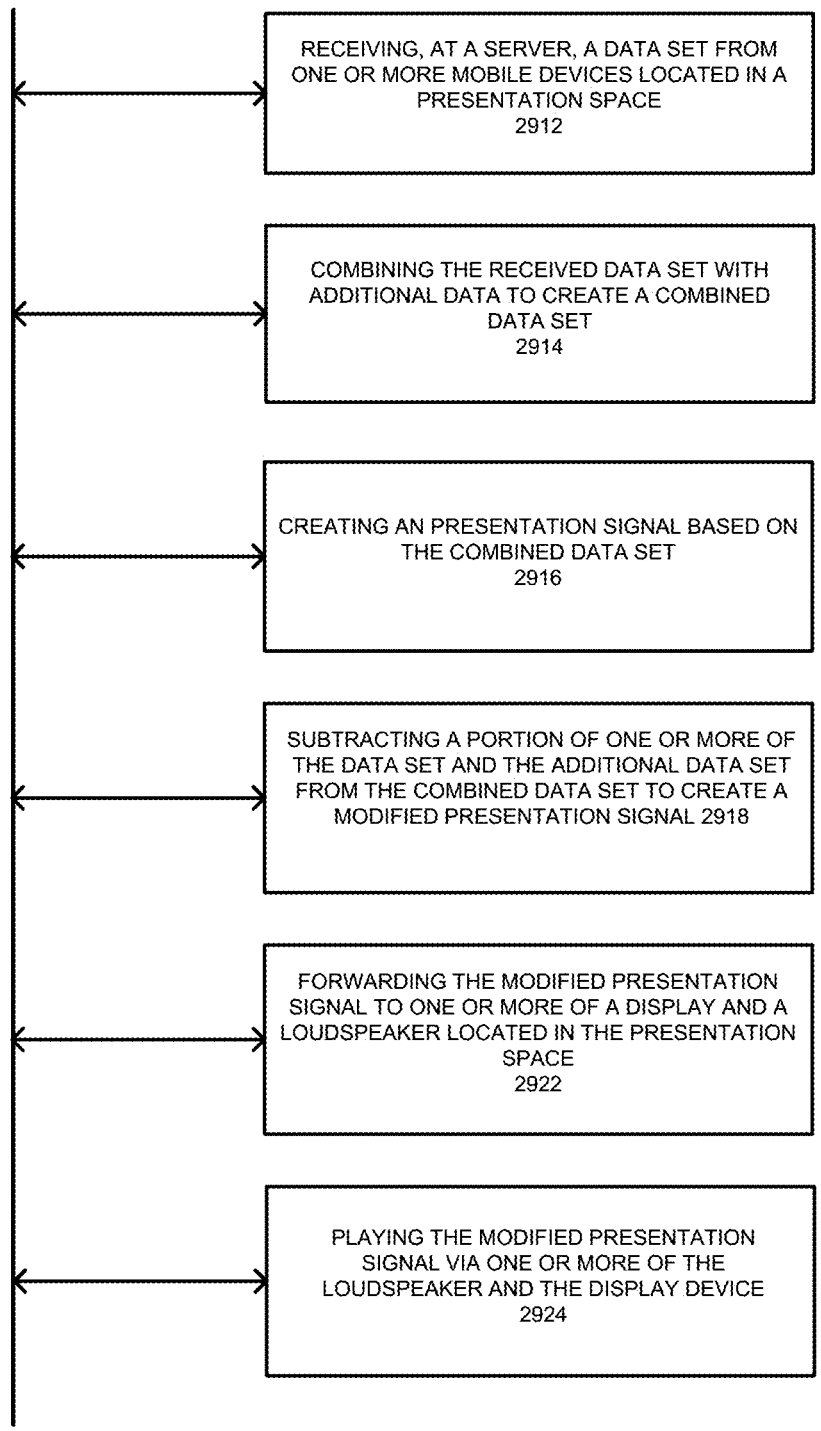
FIG. 29 illustrates an example method of receiving and processing participation data from audience member devices, in accordance with some embodiments.

FIG. 29 illustrates an example method of receiving and processing participation data from audience member devices, in accordance with some embodiments. Referring to FIG. 29, the example provides users standing in a crowded room listening to a live presentation. Each user is engaged with the presentation portal application via their smartphones. One user may view or hear a presentation notation, for example, at 3:42 pm, and become inspired and speak a question into their smartphone via the interface application, another person may do something similar at 3:44 pm, such as ask another question, this process continues for the entire 60 minute presentation. The questions are recorded, digitized, watermarks (non-audio data included in the audio data sent) are added by the system application based on known information to assist with organizing and presenting the data. Additionally, multiple questions may be submitted at the same time and recorded, queued and processed for the presenter to address in due course. For example, multiple users with multiple respective mobile computing devices may speak into their devices utilizing the conference system application that records their voice and/or text input. The computing system may then receive the data, queue the data as part of a question queue with text and/or audio/video captured during the event. The questions or comments received may be timestamped to denote the order they appear in the queue since each question received may have at least some time difference between the other received questions.

In one example, the method 2900 may include receiving, at a server, a data set from one or more mobile devices located in a presentation space 2912, combining the received data set with additional data to create a combined data set 2914, creating a presentation signal based on the combined data set 2916, subtracting a portion of one or more of the data set and the additional data set from the combined data set to create a modified presentation signal 2918, forwarding the modified presentation signal to one or more of a display and a loudspeaker located in the presentation space 2922, and playing the modified presentation signal via one or more of the loudspeaker and the display device 2924.

The received data set includes one or more of textual data, audio data, image data and video data. The subtracted portion of the one or more of the data set and the additional data includes one or more of audio output of the loudspeaker recorded during a recording of the received data set and audio output associated with audience members of the presentation near the mobile device which recorded the data set. The method may include adding a watermark signal to the data set prior to forwarding the data set from the one or more mobile devices. The watermark signal can include identification information associated with the one or more mobile devices, location information of the one or more mobile devices and data subtraction information regarding information to subtract from the presentation signal to remove unwanted audio signals. The method may include displaying the data set on a display associated with a presenter device in communication with the presentation server and delaying the playing of the modified presentation signal via the loudspeaker for a predefined period of time.

Figure 30:
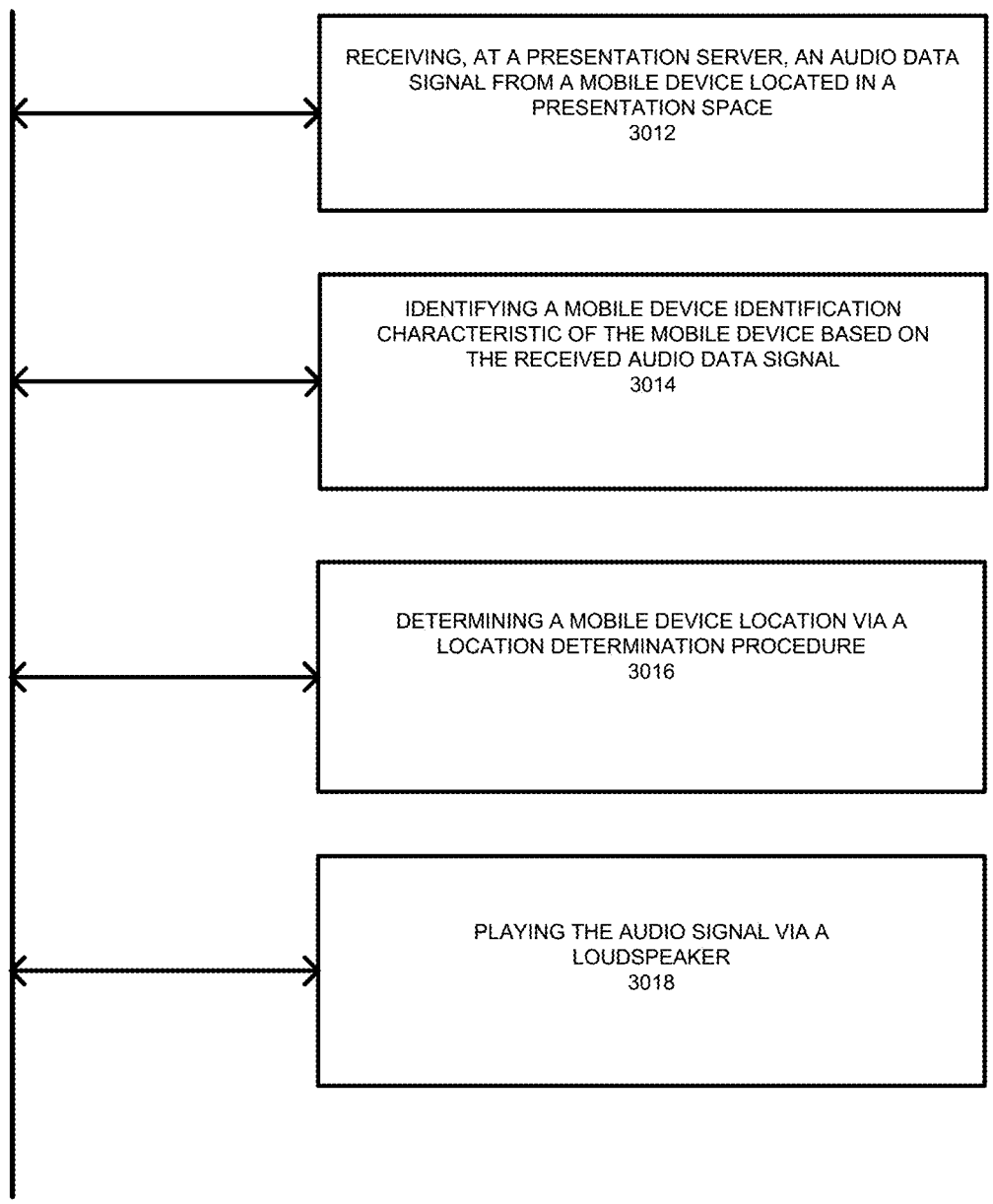
FIG. 30 illustrates another example method of receiving and processing participation data from audience member devices, in accordance with some embodiments.

FIG. 30 illustrates another example method of receiving and processing participation data from audience member devices, in accordance with some embodiments. Referring to FIG. 30, the method 3000 may include receiving, at a presentation server, an audio data signal from a mobile device located in a presentation space 3012, identifying a mobile device identification characteristic of the mobile device based on the received audio data signal 3014, determining a mobile device location via a location determination procedure 3016, and playing the audio signal via a loudspeaker 3018.

The method may also include mixing the audio signal with a watermark audio signal, responsive to identifying the mobile device location, capturing a photograph of the location of the mobile device to identify a participant associated with the mobile device, forwarding the photograph to participating mobile devices when playing the audio signal via the loudspeaker. The received audio data signal includes one or more of textual data, audio data, image data and video data. The watermark audio signal includes identification information associated with the one or more mobile devices, location information of the one or more mobile devices and data subtraction information regarding information to subtract from the audio signal. The method may also include displaying the audio data on a display associated with a presenter device in communication with the presentation server. The method may also include determining a mobile device location via a location determination procedure which includes identifying a microphone nearest a location where the mobile device is located based on the audio data signal received from the mobile device at the nearest microphone, and determining the location of the mobile device based on a location of the nearest microphone.

Figure 31:
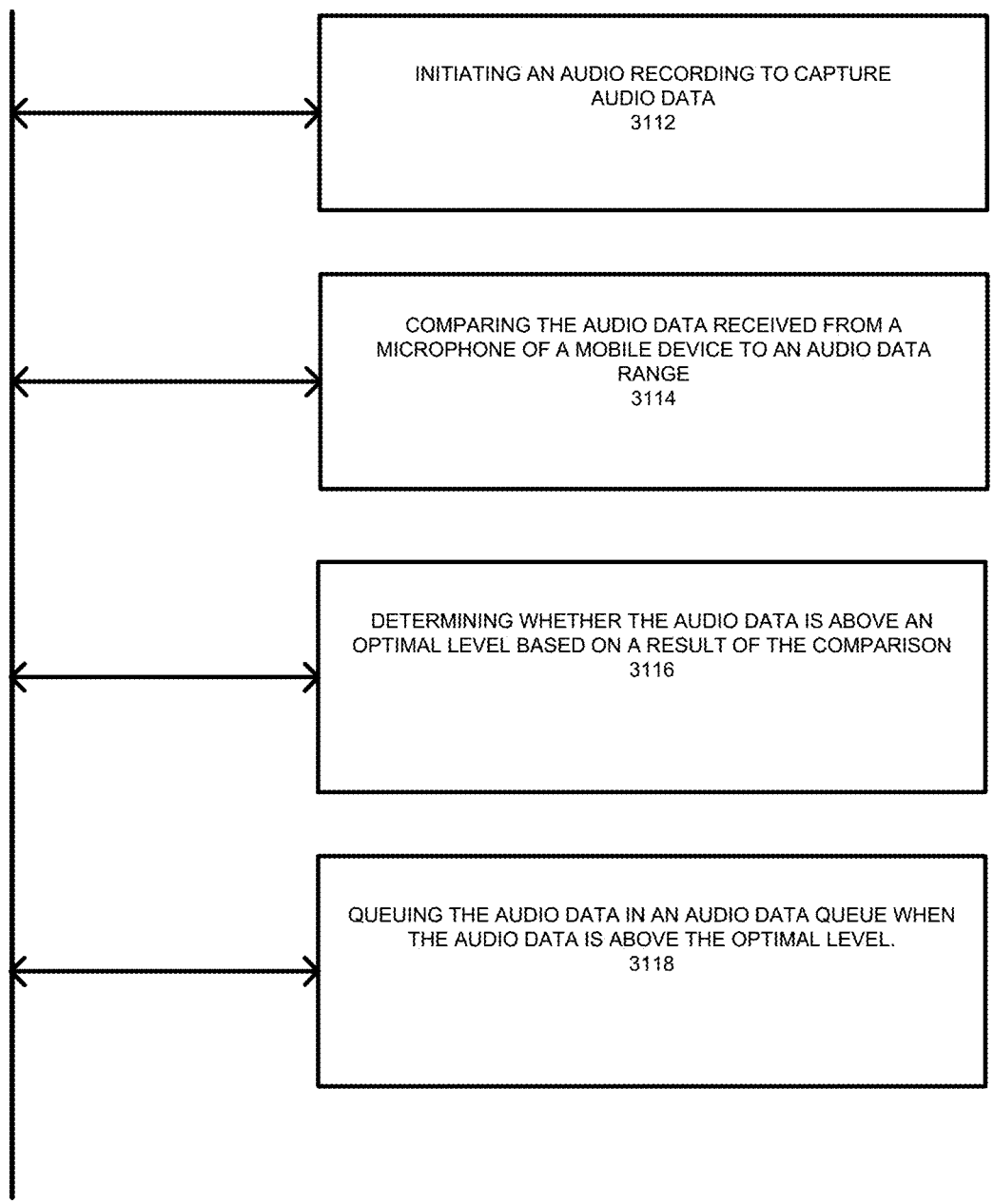
FIG. 31 illustrates another example method of receiving and processing participation data from audience member devices, in accordance with some embodiments.

FIG. 31 illustrates another example method of receiving and processing participation data from audience member devices, in accordance with some embodiments. Referring to FIG. 31, the method 3100 may include initiating an audio recording to capture audio data 3112, comparing the audio data received from a microphone of a mobile device to an audio data range 3114, determining whether the audio data is above an optimal level based on a result of the comparison 3116, and queuing the audio data in an audio data queue when the audio data is above the optimal level 3118.

The audio data range is one or more of a frequency range and an amplitude range. The audio data is not above the optimal level filtering the audio data to remove excessive background audio data. The excessive background audio data is identified as an audio signal above a threshold amplitude level at a particular frequency range. When the audio data is not acceptable, the method may include forwarding a prompt to the mobile device to modify an audio input strategy, receiving additional audio data subsequent to the audio data being received, and determining the additional audio data is above the optimal level. The method may include identifying a device model of the mobile device, and automatically adjusting one or more of a gain, a frequency and an amplitude of the audio signal received based on the device model identified. Additionally, audience members may also speak in their native language, which may be converted to the language of the presenter prior to appearing in the question queue. Then, once answered, assuming the question is selected during the presenter response, the response may be automatically translated back to the first language and shared with the original audience member by transferring the data back to the user's device.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 32 illustrates an example computer system architecture 3200, which may represent or be integrated in any of the above-described components, etc.

Figure 32:
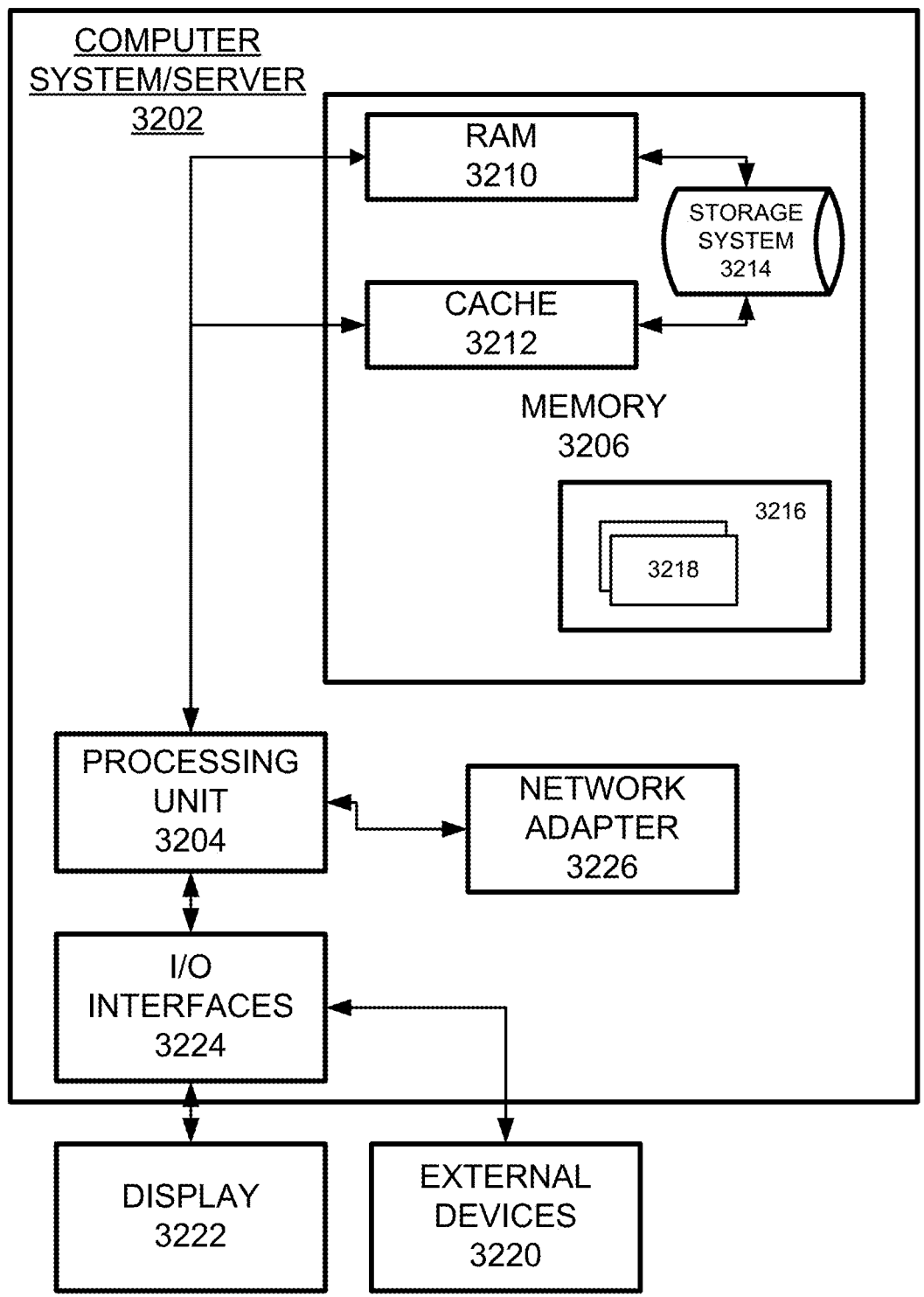
FIG. 32 illustrates an example computer system for supporting the receiving and processing of participation data from audience member devices, in accordance with some embodiments.

FIG. 32 is not intended to suggest any limitation as to the scope of use or functionality of embodiments of the application described herein. Regardless, the computing node is capable of being implemented and/or performing any of the functionality set forth hereinabove.

In computing node 3200 there is a computer system/server 3202, which is operational with numerous other general purpose or special purpose computing system environments or configurations. Examples of well-known computing systems, environments, and/or configurations that may be suitable for use with computer system/server 3202 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 3202 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 3202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 32, computer system/server 3202 in cloud computing node 3200 is shown in the form of a general-purpose computing device. The components of computer system/server 3202 may include, but are not limited to, one or more processors or processing units 3204, a system memory 3206, and a bus that couples various system components including system memory 3206 to processor 3204.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 3202 typically includes a variety of computer system readable media. Such media may be any available media that is accessible by computer system/server 3202, and it includes both volatile and non-volatile media, removable and non-removable media. System memory 3206, in one embodiment, implements the flow diagrams of the other figures. The system memory 3206 can include computer system readable media in the form of volatile memory, such as random-access memory (RAM) 3210 and/or cache memory 3212. Computer system/server 3202 may further include other removable/non-removable, volatile/non-volatile computer system storage media. By way of example only, memory 3206 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 3206 may include at least one program product having a set (e.g., at least one) of program modules that are configured to carry out the functions of various embodiments of the application.

Program/utility, having a set (at least one) of program modules, may be stored in memory 3206 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 3202 may also communicate with one or more external devices 3220 via a I/O adapter 3224, such as a keyboard, a pointing device, a display 3222, etc.; one or more devices that enable a user to interact with computer system/server 3202; and/or any devices (e.g., network card, modem, etc.) that enable computer system/server 3202 to communicate with one or more other computing devices. Such communication can occur via I/O interfaces 3224 of the adapter 3226. Still yet, computer system/server 3202 can communicate with one or more networks such as a local area network (LAN), a general wide area network (WAN), and/or a public network (e.g., the Internet) via network adapter. As depicted, adapter 3226 communicates with the other components of computer system/server 3202 via a bus. It should be understood that although not shown, other hardware and/or software components could be used in conjunction with computer system/server 3202. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

While example embodiments have been particularly shown and described, it will be understood by those skilled in the art that various changes in form and details may be made therein without departing from the scope of the embodiments encompassed by the appended claims.

What is claimed is:

1. A method comprising:
receiving, at a server, a data set comprising recorded audio from one or more mobile devices located in a presentation space;
combining the received data set with additional audio data recorded from a different device to create a combined data set;
creating a presentation signal based on the combined data set;
subtracting a portion of the recorded audio from the combined data set to create a modified presentation signal, wherein the subtracted portion of the one or more of the data set and the additional data comprises audio output of a loudspeaker recorded during a recording of the received data set;
forwarding the modified presentation signal to one or more of a display and the loudspeaker located in the presentation space; and
playing the modified presentation signal via one or more of the loudspeaker and the display device.

2. The method of claim 1, wherein the received data set further comprises one or more of textual data, image data and video data.

3. The method of claim 1, wherein the subtracted portion of the one or more of the data set and the additional data further comprises audio output associated with audience members of the presentation near the mobile device which recorded the data set.

4. The method of claim 1, comprising
adding a watermark signal to the data set prior to forwarding the data set from the one or more mobile devices.

5. The method of claim 4, wherein the watermark signal comprises identification information associated with the one or more mobile devices, location information of the one or more mobile devices and data subtraction information regarding information to subtract from the presentation signal.

6. The method of claim 1, displaying the data set on a display associated with a presenter device in communication with the presentation server.

7. The method of claim 1, delaying the playing of the modified presentation signal via the loudspeaker for a predefined period of time.

8. An apparatus comprising:
a receiver configured to receive a data set comprising recorded audio from one or more mobile devices located in a presentation space;
a processor configured to
combine the received data set with additional audio data recorded from a different device to create a combined data set;
create a presentation signal based on the combined data set;
subtract a portion of the recorded audio from the combined data set to create a modified presentation signal, wherein the subtracted portion of the one or more of the data set and the additional data comprises audio output of a loudspeaker recorded during a recording of the received data set;
forward the modified presentation signal to one or more of a display and the loudspeaker located in the presentation space; and
play the modified presentation signal via one or more of the loudspeaker and the display device.

9. The apparatus of claim 8, wherein the received data set further comprises one or more of textual data, image data and video data.

10. The apparatus of claim 8, wherein the subtracted portion of the one or more of the data set and the additional data further comprises audio output associated with audience members of the presentation near the mobile device which recorded the data set.

11. The apparatus of claim 8, wherein the processor is further configured to
add a watermark signal to the data set prior to forwarding the data set from the one or more mobile devices.

12. The apparatus of claim 11, wherein the watermark signal comprises identification information associated with the one or more mobile devices, location information of the one or more mobile devices and data subtraction information regarding information to subtract from the presentation signal.

13. The apparatus of claim 8, wherein the processor is further configured to display the data set on a display associated with a presenter device in communication with the presentation server.

14. The apparatus of claim 8, wherein the processor is further configured to delay the playing of the modified presentation signal via the loudspeaker for a predefined period of time.

15. A non-transitory computer readable storage medium configured to store instructions that when executed cause a processor to perform:
receiving, at a server, a data set comprising recorded audio from one or more mobile devices located in a presentation space;
combining the received data set with additional audio data recorded from a different device to create a combined data set;
creating a presentation signal based on the combined data set;
subtracting a portion of the recorded audio from the combined data set to create a modified presentation signal, wherein the subtracted portion of the one or more of the data set and the additional data comprises audio output of a loudspeaker recorded during a recording of the received data set;
forwarding the modified presentation signal to one or more of a display and the loudspeaker located in the presentation space; and
playing the modified presentation signal via one or more of the loudspeaker and the display device.

16. The non-transitory computer readable storage medium of claim 15, wherein the received data set further comprises one or more of textual data, image data and video data.

17. The non-transitory computer readable storage medium of claim 15, wherein the subtracted portion of the one or more of the data set and the additional data further comprises audio output associated with audience members of the presentation near the mobile device which recorded the data set.

18. The non-transitory computer readable storage medium of claim 15, wherein the processor is further configured to perform:
adding a watermark signal to the data set prior to forwarding the data set from the one or more mobile devices.

19. The non-transitory computer readable storage medium of claim 18, wherein the watermark signal comprises identification information associated with the one or more mobile devices, location information of the one or more mobile devices and data subtraction information regarding information to subtract from the presentation signal.

20. The non-transitory computer readable storage medium of claim 15, wherein the processor is further configured to perform:

displaying the data set on a display associated with a presenter device in communication with the presentation server.

\* \* \* \* \*